(12) United States Patent  
Wagner et al.

(10) Patent No.: US 9,713,957 B2  
(45) Date of Patent: Jul. 25, 2017

(54) METHOD AND APPARATUS FOR DISPLAYING AT LEAST ONE OPERATION PARAMETER OF A SUBJECT VEHICLE IN THE VEHICLE

(71) Applicant: VOLKSWAGEN AG, Wolfsburg (DE)

(72) Inventors: Volkmar Wagner, Berlin (DE); Mi-Ran Jun, Berlin (DE); Sönke Petersen, Berlin (DE); David Schriever, Wendeburg (DE); Matthias Peukert, Braunschweig (DE); Tobias Brandt, Wolfsburg (DE); Jens Geissler, Braunschweig (DE); Martin Hofmann, Berlin (DE); Christian Burghoff, Braunschweig (DE)

(73) Assignee: VOLKSWAGEN AG (DE)

( * ) Notice: Subject to any disclaimer, the term of this patent is extended or adjusted under 35 U.S.C. 154(b) by 128 days.

(21) Appl. No.: 14/747,733

(22) Filed: Jun. 23, 2015

(65) Prior Publication Data

US 2015/0367730 A1    Dec. 24, 2015

(30) Foreign Application Priority Data

Jun. 24, 2014  (DE) .................. 10 2014 212 092

(51) Int. Cl.
*B60K 35/00*        (2006.01)
*G01D 7/04*         (2006.01)
(Continued)

(52) U.S. Cl.
CPC .............. *B60K 35/00* (2013.01); *B60K 37/04* (2013.01); *G06T 1/20* (2013.01);
(Continued)

(58) Field of Classification Search
None
See application file for complete search history.

(56) References Cited

U.S. PATENT DOCUMENTS

2006/0092098 A1* 5/2006 Yokota ................... B60K 35/00  
345/33  
2008/0211652 A1* 9/2008 Cope ...................... B60K 35/00  
340/461  
(Continued)

FOREIGN PATENT DOCUMENTS

CN       101817309 A     9/2010  
CN       102616140 A     8/2012  
(Continued)

OTHER PUBLICATIONS

Office Action for Chinese Trademark Application No. 201510308826.9; May 9, 2017.

*Primary Examiner* — Demetra Smith-Stewart  
(74) *Attorney, Agent, or Firm* — Barnes & Thornburg LLP

(57) ABSTRACT

A method for displaying at least one parameter concerning the operation of a vehicle in the vehicle by a display device with a display surface wherein, in a first display mode of the display device, the display surface generates a display element with a first boundary and an area lying within the first boundary. The area is divided into at least a first sub-area and a second sub-area and the first sub-area includes a scale by which a state variable of the vehicle is displayed. The current value of the state variable is displayed in the first display mode by a graphical element which extends from the second sub-area in the first sub-area to the scale. Also disclosed is a device for displaying at least one parameter concerning the operation of a vehicle in the vehicle.

15 Claims, 27 Drawing Sheets

(51) Int. Cl.
*G01D 7/08* (2006.01)
*B60K 37/04* (2006.01)
*G06T 1/20* (2006.01)

(52) U.S. Cl.
CPC ............. *B60K 2350/1072* (2013.01); *B60K 2350/1076* (2013.01); *B60K 2350/352* (2013.01)

(56) References Cited

U.S. PATENT DOCUMENTS

| 2008/0309475 | A1* | 12/2008 | Kuno | B60K 35/00 340/462 |
| 2014/0167948 | A1* | 6/2014 | Mejia | B60K 37/02 340/441 |

FOREIGN PATENT DOCUMENTS

| CN | 103687743 A | 3/2014 |
|----|----|----|
| DE | 4307367 A1 | 9/1994 |
| DE | 19902136 A1 | 8/1999 |
| EP | 1190886 A2 | 3/2002 |
| EP | 1559995 A1 | 8/2005 |
| EP | 1582393 A2 | 10/2005 |
| WO | 03057552 A1 | 7/2003 |

* cited by examiner

METHOD AND APPARATUS FOR DISPLAYING AT LEAST ONE OPERATION PARAMETER OF A SUBJECT VEHICLE IN THE VEHICLE

PRIORITY CLAIM

This patent application claims priority to German Patent Application No. 10 2014 212 092.6, filed 24 Jun. 2014, the disclosure of which is incorporated herein by reference in its entirety.

SUMMARY

The amount of information that is displayed to a vehicle driver is rising constantly owing to the increasing number of comfort facilities. The comfort facilities that are used in modern vehicles include navigation equipment, telecommunications equipment, driver assistance systems and warning notices for a plurality of devices of the vehicle and for ambient conditions. Multifunction operating and display devices are therefore used in many vehicles. Conventionally, the display of such multifunction operating and display devices is disposed in the central console. Moreover, such vehicles comprise a so-called combination instrument close to the primary field of view of the vehicle driver, which displays dynamic information and monitoring information to which the vehicle driver may have to respond immediately. Recently, besides conventional mechanical dial instruments the combination instruments also comprise freely programmable displays, which replace the mechanical dial instruments and additionally display information of a navigation device, a telecommunications device and in particular the driver assistance systems. The display of comprehensive information in the combination instrument of the vehicle has the advantage that the vehicle driver only has to divert his view slightly from traffic events to perceive the displayed information.

If very comprehensive information is displayed in the combination instrument, there is still the problem that the vehicle driver can no longer process the desired information rapidly and intuitively and is distracted from driving by the abundance of information on the display of the combination instrument. For this reason, new concepts are being worked on as to how information can be displayed by means of display devices in a vehicle close to the field of view of the vehicle driver, in particular by means of the combination instrument. During the display of information, it is particularly important that the vehicle driver can absorb the information as rapidly and intuitively as possible. At the same time, such information should be displayed that is particularly relevant to the vehicle driver in the respective driving situation. In this way a contribution to the safe control of the vehicle is made by the display and operating concept.

Illustrative embodiments provide a method and a device of the above-mentioned type in a vehicle, with which diverse information can be displayed such that an observer within the vehicle can comprehend it rapidly and intuitively.

BRIEF DESCRIPTION OF THE DRAWINGS

The disclosed embodiments will now be explained with reference to the accompanying figures.

DETAILED DESCRIPTION OF THE DISCLOSED EMBODIMENTS

Figure 1:
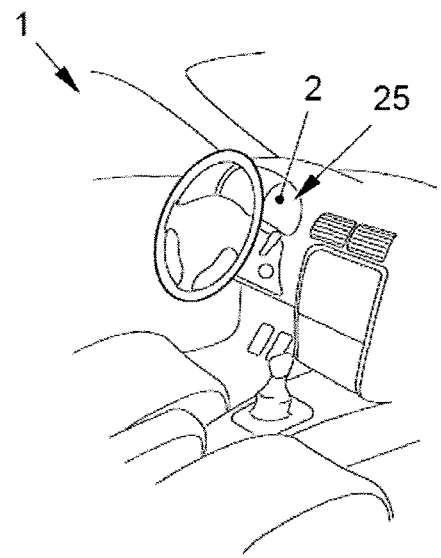
FIG. 1 shows schematically the arrangement of an exemplary embodiment of the device in a vehicle.

With the method, in a first display mode of the display device, the display surface is activated such that a display element is generated with a first boundary and an area lying within the first boundary. In this case the area is divided into at least a first sub-area and a second sub-area and the first sub-area comprises a scale, by means of which a state variable of the vehicle is displayed. The current value of the state variable is displayed in the first display mode by means of a graphical element that extends from the second sub-area in the first sub-area to the scale. Furthermore, the parameter is recorded. In addition, an operating action is recorded by which the display device is brought from the first display mode into a second display mode. In the second display mode, the display element is generated such that the second sub-area is visually delimited from the first sub-area by a second boundary, that the second sub-area is divided into a central area and an inner area, wherein a third boundary is formed between the central area and the inner area and wherein the central area is disposed between the first sub-area and the inner area. In addition, the display element is generated in the second display mode such that the graphical element extends from the second boundary to the scale, so that the graphical element is only displayed in the first sub-area and that the value of the parameter is displayed using different types of representation in the central area and the inner area.

Although in the first display mode the area is already divided into a first sub-area and a second sub-area, the division can also only be carried out internally within the display device. The division must not be displayed on the display surface in the first display mode. In addition, in the second display mode the central area of the second sub-area is defined relative to the first sub-area. It is referred to as the central area because in the second display mode it is disposed between the first sub-area and the inner area of the second sub-area.

The method enables a parameter of the vehicle to be displayed to the user using different types of representation in only one display element. This enables complex representations to be displayed to the user in the central area in the second display mode for example. At the same time the same parameter can be displayed in the inner area in a simple type of representation.

Moreover, the first display mode can show a classic view of a display. A modern view can be provided in the second display mode.

According to at least one disclosed embodiment of the method, in the first display mode the second sub-area is already divided into the central area and the inner area. The third boundary is formed between the central area and the inner area. In addition, the graphical element is a pointer element that comprises a pointer and a pointer base, wherein the pointer base is disposed on the third boundary in the first display mode and is disposed on the second boundary in the second display mode. As a result the pointer element is prevented from extending through an area of the second sub-area in the second display mode and in doing so interfering with the display of the parameter.

In particular, the first boundary can be circular, so that the display element displays a circular disk in the first display mode. The second and third boundaries can also be circular, so that in the second display mode the first sub-area with the scale forms an outer ring, the central area forms a central ring and the inner area forms an inner circular disk. As a result, the display element achieves a particular design in the second display mode, by means of which modern displays of parameters can be realized. By means of the circular embodiment of the display element, in particular a mechanical dial instrument, which as a rule is displayed in a combination instrument of a vehicle, can be replaced by the circular embodiment of the display element. Such mechanical dial instruments can thus in particular be replaced by a fully digital display by means of one display. As a result, variable embodiments can be provided for users that place great value on a modern design of combination instruments.

According to another disclosed embodiment, in the event of a changeover from the first display mode into the second display mode the inner area is enlarged, the central area is reduced, the pointer base is displaced from the third boundary to the second boundary and at the same time the length of the pointer is reduced from its initial length to a final length. The changeover from the first display mode to the second display mode is therefore represented by a fluid animation, whose end point is the display of the second display mode. If a change back from the second display mode to the first display mode is made, the animation can run in reverse. By means of such an animation the user is advantageously shown that he has just changed the display mode. As a result, he is more likely to be aware of an unintended change of the display mode. In addition, the user can be provided with a visually interesting changeover from the first display mode to the second display mode.

According to another disclosed embodiment, the value of the parameter is displayed numerically in the inner circular disk in the second display mode. The value of the parameter is displayed by a length of a ring segment-shaped element in the central ring. If the value of the parameter changes, the numerical value and the length of the ring segment-shaped element are changed accordingly. The representation of the value of the parameter in the central ring corresponds in this case to a bar display, wherein the shape of the bar is adapted to the geometry of the central ring. If the value is increased, the length of the ring segment-shaped element is extended. Accordingly, the length of the ring segment-shaped element is reduced if the value of the parameter is reduced. A particularly sophisticated representation of the parameter on the display surface is displayed to the user by the graphical presentation of the numerical value displayed in the inner circular disk in the central ring.

In a further disclosed embodiment, the parameter is an acceleration of the vehicle. In the second display mode, at least one graphical object is then displayed in an initial position in the central ring. If the vehicle is not accelerated, the graphical object remains in the initial position. If by contrast the vehicle is accelerated, the graphical object is displaced in the central ring away from the initial position. In particular, the graphical object comprises a ring segment-shaped object. The initial position in the central ring is displayed by a marker, wherein the ring segment-shaped object is disposed in the initial position such that it is bisected by the marker. If a negative acceleration is detected, the ring segment-shaped object is displaced in a first direction starting from the initial position in the central ring. If a positive acceleration is detected, the ring segment-shaped object is displaced in a second direction opposite to the first direction in the central ring. From the displacement of the ring segment-shaped object, the user can then better assess his own manner of driving. If the ring segment-shaped object is displaced back and forth in the central ring a lot, this means that the driver is driving unsteadily. As a result, in particular a braking process can be displayed by displacing the ring segment-shaped object upward in the central ring and an increase in speed can be displayed by displacing the ring segment-shaped object downward in the central ring. The magnitude of the acceleration can additionally be displayed to the user by means of a distance and speed of the displacement of the ring segment-shaped object in the central ring.

In the event of full braking, the ring segment-shaped object is displaced very rapidly and very far in the first direction in the central ring. In the event of a so-called kick-start, during which the user depresses the gas pedal far down, the ring segment-shaped object is displaced very rapidly and very far in the second direction in the central ring. The disclosed embodiment of the central ring can be used as a trainer for an energy-saving manner of driving. The aim for the driver is then that the ring segment-shaped object moves away from the initial position as little as possible.

Furthermore, a region in the central ring can be highlighted and, if the graphical object is displaced over the region in the first or the second direction, the type of representation of the graphical object can change. As a result, it can in particular be displayed to the user that his current manner of driving is wasting a lot of energy.

According to a further disclosed embodiment, a further operating action is detected, with which the display is configured in the second display mode in the central area and the inner area. As a result, the user can determine for himself the manner in which parameters are displayed in the central area and/or the inner area in the second display mode.

In addition, the parameter can be selected from a number of possible parameters by means of the further operating action. The selected parameter is then displayed in the central area and the inner area. The user can then not only determine the type of representation of the parameter in the second display mode, but can also select which parameter is shown in the central area and the inner area.

The parameter can, in particular, comprise a residual range, a consumption, an average consumption, a refueling quantity, a time remaining until a destination, an additional residual range to be achieved by a changed manner of driving, an oil temperature, a speed of the vehicle and/or a driving time since the last refueling of the vehicle. A display of the parameters is particularly advantageous for the user, because they represent the most relevant parameters for the driver.

In addition, a region for displaying a critical range of values of a further parameter can be displayed in the display element. In this case the current value of the further parameter is determined. At least one further scale, which shows possible values of the further parameter and which is divided into a plurality of scale segments, and a further graphical element, which indicates the current value of the further parameter on the further scale, are displayed in the region in the display element. If the further parameter has reached a predefined critical value, the region of the display surface is activated such that at least one scale segment of the further scale is changed such that the scale segment is displayed at least partly highlighted as a critical range of values of the further parameter.

In particular, a range of values that is reached if the value of the further parameter has become greater than or less than a limit value is understood as a critical range of values. The limit value is referred to as a critical value. If the value of the further parameter has reached the critical range of values, in particular an intervention by the user, although not absolutely necessary immediately, will be necessary in the foreseeable future.

The further scale is in particular divided into scale segments by various scale marks. A scale segment thus extends from one scale mark to the next scale mark. If the further scale for example comprises nine scale marks, it is divided into eight scale segments.

If the further parameter has reached the predefined critical value, a value of a parameter that is at least partly dependent on the further parameter can be determined and displayed. In particular, if the further parameter has reached the predefined critical value, the scale segments that do not form the critical range of values are no longer displayed, and in their place the value of the parameter dependent on the further parameter is displayed. As a result a parameter dependent on the further parameter can advantageously be displayed. The value then inevitably thus also lies in a critical region. A region on the display surface can thus advantageously be used for the display of at least two critical values. In particular, in this case the value of the parameter that is dependent on the further parameter is not displayed if the further parameter has not yet reached the predefined critical value.

The further parameter can be an amount of energy stored in an energy storage means of the vehicle and the parameter that is dependent on the further parameter can be the residual range of the vehicle. Here it is to be noted that the residual range of the vehicle is not exclusively dependent on the amount of energy still remaining in the vehicle. In particular, the current manner of driving and the current settings of an air conditioning system or other vehicle functions also affect the residual range. It can thus occur that the critical region is always reached if a defined scale segment is reached. However, the residual range that is then displayed can vary depending on the manner of driving and the settings of the vehicle functions.

In addition, the type of energy can either be supplied conventionally by means of a fuel, such as gasoline or diesel. Alternatively or additionally, the energy can also be stored in a battery, so that the vehicle is then at least partly driven by electrical energy. If the vehicle is a hybrid vehicle, the vehicle comprises both types of energy.

In particular, for the display of the critical range of values, the predefined critical value is not reached. This is in particular the case if the further parameter is an amount of energy stored in an energy storage means of the vehicle. The critical range of values is reached if the energy storage means is only filled to an eighth full, for example. As a result it is displayed to the user that he should replenish the energy storage means of the vehicle.

The critical range of values can be shown highlighted by an elongated graphical object extending at least partly over the scale segment. By this means an unambiguous and intuitive way of illustrating the critical range of values is advantageously provided for the user.

In addition, a plurality of graphical elements can be displayed at a distance apart from each other in a further region on the display surface. A value of yet another parameter is recorded. The graphical elements are displaced in a direction on the display surface depending on the value of the other parameter such that a graphical element disappears from the region if it has reached a first boundary of the region, and a new graphical element is displayed at a second boundary opposite the first boundary.

The distance between each two adjacent graphical elements can be greater in the direction of motion of the graphical elements. As a result, the other parameter can be shown in a perspective manner. In addition, the user is given the impression that the road is being displayed in the further region.

The graphical elements can in particular be parallel running horizontal lines, wherein the direction of motion of the horizontal lines is perpendicular to the horizontal lines. This means that the horizontal lines either move up or down on the display surface. In particular, if the lines are moved down on the display surface, the driver gets the impression that he is driving over the lines.

The other parameter can be the speed of the vehicle here. This has the advantage that the speed of the vehicle can be rapidly and intuitively assessed as a safety-relevant parameter. In addition to a numerical display, the user can be given a feel for the driving speed by means of the display. This is in particular advantageous in the event of a change from a road that is driven on at high speed, for example a freeway, to a road that is driven on at lower speed, for example a country road.

Disclosed embodiments also relate to a device provided in the vehicle for the display of at least one of the parameters concerning the operation of a vehicle. The device comprises a display device with a display surface, wherein the display device can be operated in at least two display modes. Furthermore, the device comprises an operating unit, by means of which an operating action can be detected with which the display device can be brought from the first display mode into a second display mode. The parameter can be detected by means of a detection unit. The device further comprises a control device, by means of which the display surface can be activated depending on the display mode of the display device. With this in the first display mode a display element can be generated with a first boundary and an area lying within the first boundary. The area can be divided into at least a first sub-area and a second sub-area and the first sub-area comprises a scale, by means of which a state variable of the vehicle can be displayed. Here the current value of the state variable can be displayed by means of a graphical element that extends from the second sub-area in the first sub-area to the scale. In the second display mode, the display element can be generated such that the second sub-area is visually delimited from the first sub-area by a second boundary, that the second sub-area is divided into a central area and an inner area, wherein a third boundary is formed between the central area and the inner area, and wherein the central area is disposed between the first sub-area and the inner area. The graphical element extends from the second boundary to the scale, so that the graphical element is displayed only in the first sub-area and the value of the parameter can be displayed in the central area and the inner area using different types of representation.

The device is in particular suitable for implementing the disclosed method. It therefore has all the advantages of the method. In addition, the device is in particular designed so that it can partly or fully carry out the aforementioned steps of the method.

In a further disclosed embodiment, the display surface can be divided into at least three display regions, wherein the display element can be displayed in both display regions and wherein a third display region can be displayed between the two display regions, by means of which the parameter that can be displayed in the central area and the inner area of the display element in the second display mode can be selected. Such a division of the display surface corresponds in particular to a division of a conventional combination instrument behind the steering wheel in the vehicle. In addition, if no operating action is carried out the displaced graphical elements can be displayed in the third display region.

In particular, the detection unit is connected to a plurality of sensors of the vehicle with which the value of the parameter can be determined. The detection unit can in particular be the vehicle bus, which is connected to a plurality of sensors installed in the vehicle.

Disclosed embodiments also relate to a combination instrument in a vehicle with a display device of the disclosed device. Disclosed embodiments further relate to a vehicle with such a combination instrument.

According to another disclosed embodiment, a method is provided that is carried out during the commissioning of a display device. With this method, a signal for commissioning the display device with a display surface is detected. Following the detection of the signal, a graphical element is generated on the display surface. The graphical element is displaced from an initial position to an end position, wherein the graphical element sweeps across an area on the display surface during the displacement. During the displacement, the part of the area that has already been swept over is altered in its visually perceptible characteristic. If the graphical element has reached the end position, a display element that comprises a scale is generated at least on the swept area. In addition, the display element includes the region with the scale.

Furthermore, in the event of a movement of the graphical element back to its initial position, a scale label is generated on reaching individual scale segments during the return movement.

The generated display element corresponds in particular to the previously described display element.

If a signal for switching off the display device is detected, the process can run in reverse, so that at the end of the process neither the display element nor the graphical element is displayed.

FIG. 1 shows an example of an internal view of a vehicle 1. In the vehicle 1, a display device 2 that is a combination instrument 25 is disposed behind a steering wheel, the display thereof lying within the field of view or near the field of view of the driver.

Figure 2:
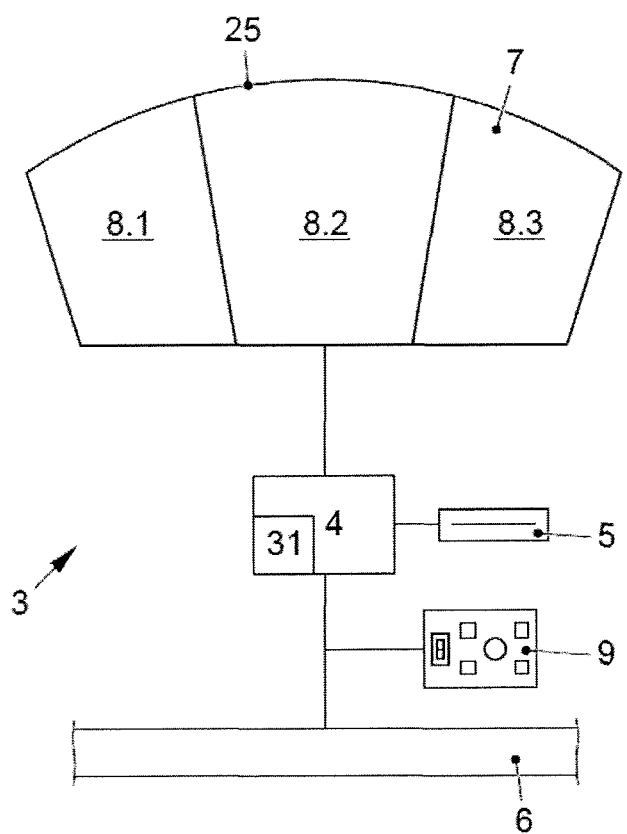
FIG. 2 shows the structure of an exemplary embodiment of the device.

The basic structure of a device 3 with the display device 2 is shown in FIG. 2. The device 3 comprises a control device 4 that is connected to a detection unit 6. This enables the control device 4 to transfer data from which the control device 4 can generate graphical data for the display surface 7 of the display device 2. Furthermore, the control device 4 can also receive data by means of other interfaces. For example, the control device 4 can be directly coupled to sensors and control units of the vehicle 1 or other devices for generating graphical data. For example, a mobile telephone of a vehicle occupant can be coupled to the control device 4. This enables access to be made to the media files or the telephone directory of the mobile telephone.

Moreover, the control device 4 is connected to a data memory 5, from which data necessary for the generation of the graphical data can be read out. The data memory 5 can for example contain one or a plurality of digital road maps. Furthermore, presets, image parameters and control values can be stored in the data memory 5.

In addition, a determination unit 31 is integrated within the control device 4, by means of which determination steps necessary for the generation of the graphical data can be undertaken. The determination unit 31 can in particular comprise an arithmetic unit, by means of which values can be calculated.

Moreover, the control device 4 is connected to an operating unit 9 that comprises an operating element or a plurality of operating elements. By means of the operating unit 9, a user can control the displays and representations of the display device 2.

The control device 4 is further connected to a freely programmable display surface 7 comprising various display regions 8.1 to 8.3. Here the display regions 8.1 to 8.3 are activated depending on a display mode in which the display device 2 is operating.

The display surface 7 can be a matrix display, for example an LCD (liquid crystal display), in particular a color display in TFT (thin-film transistor) technology. Moreover, the display can be in a so-called twisted nematic-liquid crystal display (TN-LCD), a super twisted nematic (STN) display, a dual-layer STN, an FLC (ferroelectric liquid crystal) display or an SSFLC (surface stabilized ferroelectric liquid crystal) display. A backlighting means (not shown), which can be provided by one or a plurality of light-emitting diodes, is associated with the display surface 7. Finally, the display surface 7 can also be generated by a head-up display.

Figure 3A:
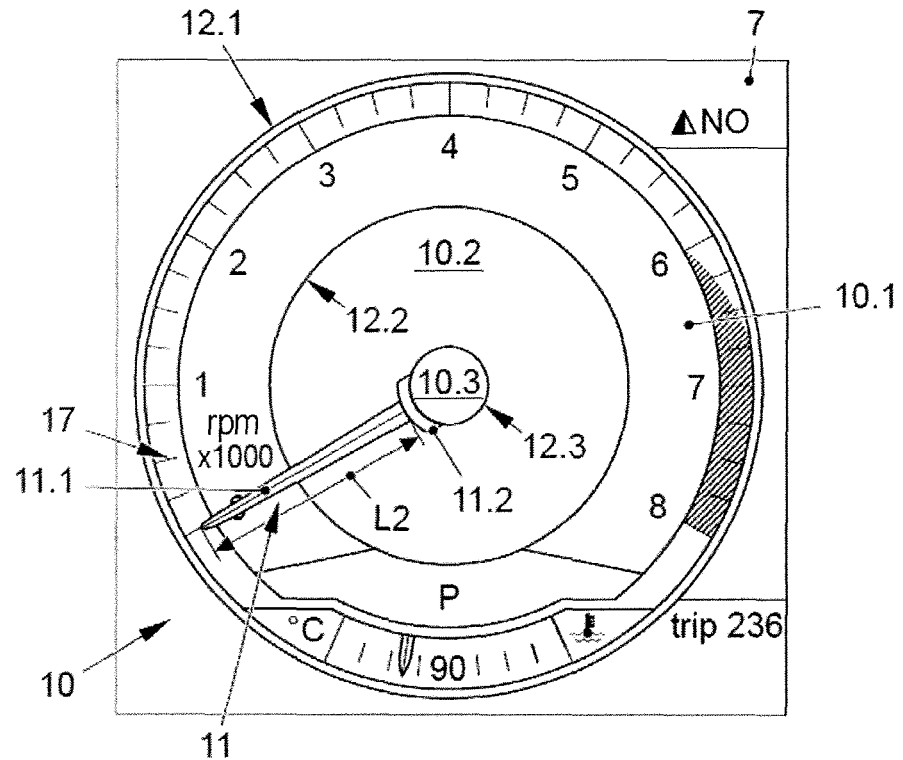
FIGS. 3a and 3b show exemplary embodiments of a display element in a first display mode and a second display mode, as they can be generated on the display surface by an exemplary embodiment of the method.

Referring to FIG. 3a, a display element 10 is explained that can be generated from the graphical data. In this case the display element 10 can in particular be displayed in the first display region 8.1 or in the third display region 8.3. In the first display mode the display element 10 represents a display of the engine revolution rate, having an essentially circular boundary 12.1 and a scale 17. Alternatively, the display element 10 can also be a speed display, which also comprises an essentially circular boundary 12.1 and a scale 17. However, the value of any other state variable can also be displayed instead of the engine revolution rate or the speed.

The display element 10 is furthermore divided into three areas 10.1 to 10.3. In the first sub-area 10.1 the scale 17 as well as a scale label are displayed by means of numerical values. The scale 17 indicates the possible values of the engine revolution rate or the speed.

In addition, the display element 10 comprises a second sub-area that provides a central area 10.2. The central area 10.2 is visually delimited from the first sub-area 10.1 by the second boundary 12.2.

A third sub-area is provided by the inner area 10.3. In this case the inner area 10.3 is visually delimited from the second sub-area or the central area 10.2 by the third boundary 12.3.

The three boundaries 12.1 to 12.3 are of circular form here. The display element 10 therefore represents a dial instrument, as provided in a conventional combination instrument 25.

In the first display mode, separate information content is neither displayed in the central area 10.2 nor in the inner area 10.3. Rather, a pointer-shaped graphical element 11 is displayed in the central area 10.2 and in the first display mode the inner area 10.3 forms a base point for the graphical element 11.

The graphical element 11 is used to display the current value of the engine revolution rate or the speed on the scale 17. The pointer-shaped graphical element 11 can be divided into a pointer 11.1 as well as a pointer base 11.2 in this case. The pointer base 11.2 is disposed directly on the circular boundary 12.3 of the inner area 10.3 in this case. This gives the visual impression that the pointer 11.1 rotates around the inner area 10.3 if the engine revolution rate or the speed varies.

The display element 10 represents a dial instrument in a classic view in the first display mode.

Figure 3B:
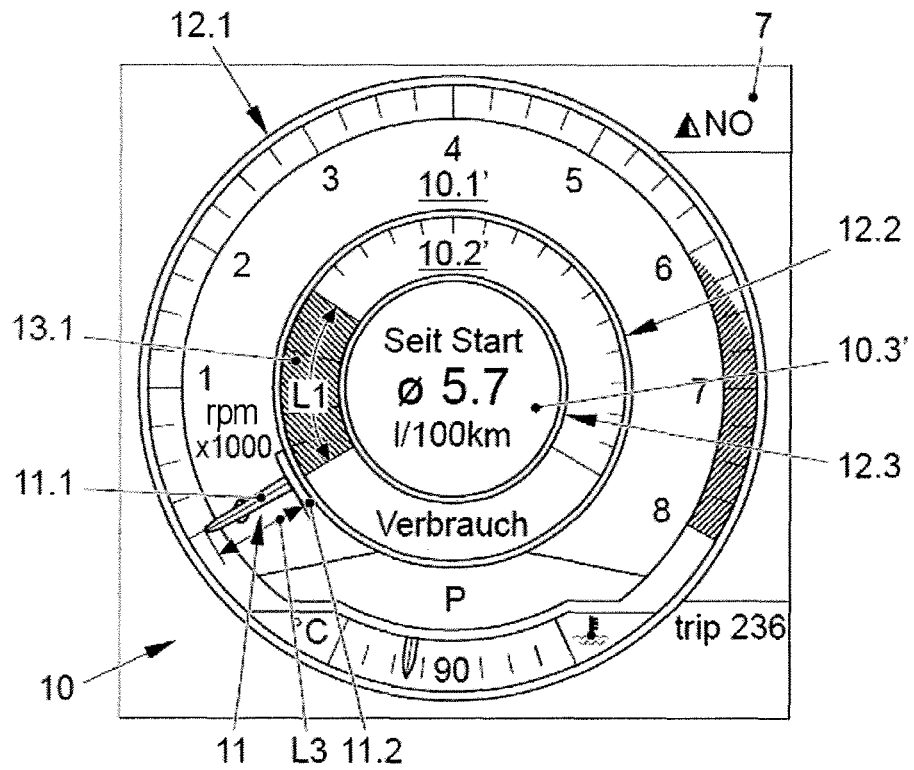

Referring to FIG. 3b, the display element 10 is explained in a second display mode.

In the second display mode, the first sub-area 10.1 of the display element 10 remains unchanged. The scale 17 continues to be displayed there.

The radius of the circular boundary 12.3 is increased in the second display mode in comparison to the circular boundary 12.3 of the first display mode. The inner area 10.3 now represents an inner circular disk 10.3'. As a result a larger display region is provided in the inner area 10.3 of the second display mode. In the second display mode a numerical value of a parameter is displayed in the inner circular disk 10.3', for example the average consumption.

Because the first sub-area 10.1 remains unchanged, the increase of the radius of the inner area 10.2 results in a reduction of the central area 10.2. The central area 10.2 represents a central ring 10.2' in the second display mode that is disposed between the first sub-area 10.1 and the inner circular disk 10.3'. In this case the second boundary 12.2 represents an outer radius and the third boundary 12.3 an inner radius of the central ring 10.2'. The first sub-area 10.1 then represents an outer ring 10.1', wherein the second boundary 12.2 is the inner radius and the first boundary 12.1 is the outer radius of the outer ring 10.1'.

The parameter that is numerically displayed in the inner circular disk 10.3' is shown graphically in the central ring 10.2'. In the present case a bar representation for indicating the average consumption since the start is displayed. A scale is displayed on the outer radius of the central ring 10.2' for this purpose. In addition, an elongated element 13.1 with a certain arc length L1 is displayed to indicate the current value of the displayed parameter. If the current value of the average consumption changes, then the arc length L1 of the graphical element 13.1 that is displayed in the central ring 10.2' also changes. Because the geometry of the elongated graphical element 13.1 is adapted to the geometry of the central ring 10.2', it represents a ring segment-shaped element.

The pointer element 11 also changes in the second display mode. To prevent the graphical presentation of the information displayed in the inner circular disk 10.3' in the central ring 10.2' from being interfered with by the pointer element 11, the pointer element 11 is displayed in the second display mode such that the pointer base 11.2 is displaced from the circular boundary 12.3 to the circular boundary 12.2 of the central ring 10.2'. As a result, in particular the initial length L2 of the pointer 11.1 changes to the final length L3. A variation of the engine revolution rate is then only displayed in the outer ring 10.1', i.e. in the first sub-area 10.1. The pointer element 11 then rotates about the central ring 10.2' of the display element 10.

In the second display mode the display element 10 corresponds to a modern representation of a dial instrument. Advantageously, in the representation in a display element 10 a plurality of information can be displayed at the same time in one display element 10. The user can configure the information to be displayed.

The change from the first display mode to the second display mode can in particular be illustrated by an animation. With the animation, the inner area 10.3 can be smoothly increased, while at the same time the pointer base 11.2 is smoothly displaced from the circular boundary 12.3 to the circular boundary 12.2 of the central ring 10.2'. Other animations are also conceivable, by means of which the display shown in FIG. 3b can be generated.

Referring to FIGS. 4a to 4e, displays are explained in terms of how they can be generated on the display surface 7 by the display device 2 in the different display modes.

Figure 4A:
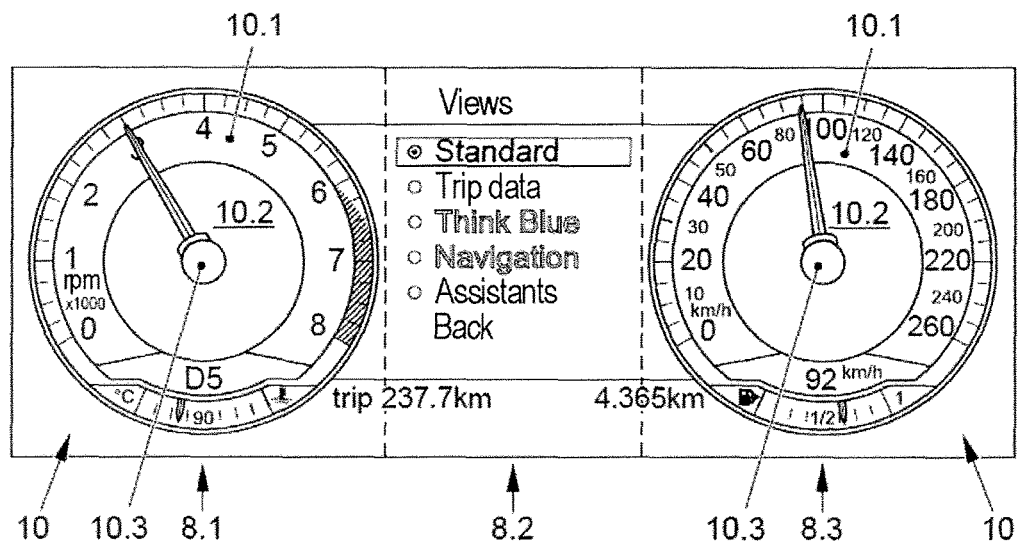
FIGS. 4a-4e show displays on the display surface as they can be generated on the display surface by the method.

The classic display is shown here in FIG. 4a. In the classic display, dial instruments are generated in the display regions 8.1 and 8.3 in the configuration as shown in FIG. 3a. In this case the engine revolution rate is displayed in the first display region 8.1 and the speed of the vehicle 1 is displayed in the third display region 8.3.

If the user wishes to change from the classic view to a modern view, or if the user wishes to have a plurality of parameters displayed, he executes an operating action with the operating unit 9, by means of which a list is generated in the second display region 8.2. All the possible views are listed in the list. The classic view is defined as the first display mode here.

Furthermore, the user can select one of the list entries from the list by means of the operating unit 9.

If the user selects the "driving data" view, this is detected as an operating action, by means of which the display device 2 can be brought into a second display mode starting from the first display mode. In this case each view listed in the list view represents a second display mode. The control device 4 first connects to the detection unit 6, which acquires the parameters that are stored for the "driving data" view. It fetches them from the data memory 5 for example. The control device 4 generates a display in the inner circular disk 10.3' from the date stored in the data memory 5, in which the average consumption since starting the vehicle 1 is displayed. The inner area 10.3 to the inner circular disk 10.3' has already been increased, as explained with reference to FIG. 3b. At the same time, an elongated element 13.1 is generated in the central ring 10.2', as also explained already with reference to FIG. 3b.

The remaining residual range, which in the present example is 298 km, is displayed in the corresponding inner circular disk 10.3' in the third display region 8.3, i.e. in the display region in which the speed display is displayed. This too has been called up from the data memory 5 by means of the detection unit 6. An elongated element 13.2, whose length represents the residual range of 298 km, is then shown in the central ring 10.2' of the display element 10 of the third display region 8.3. The length of the elongated element 13.2 can be adapted to the driving style of the driver during the operation of the vehicle 1. Finally, the residual range changes in a known way with the driving behavior and the distance covered by the vehicle 1.

Figure 4B:
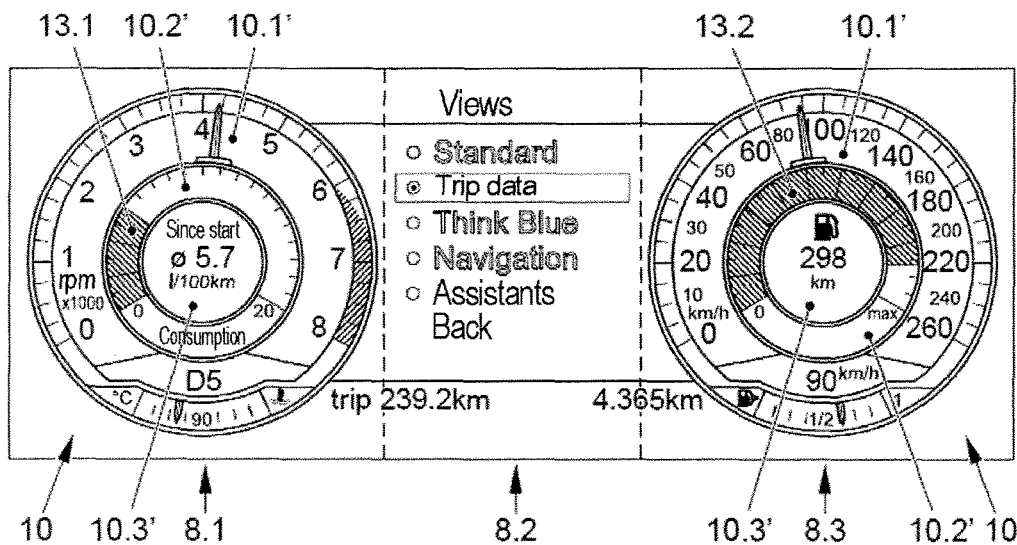
Figure 4C:
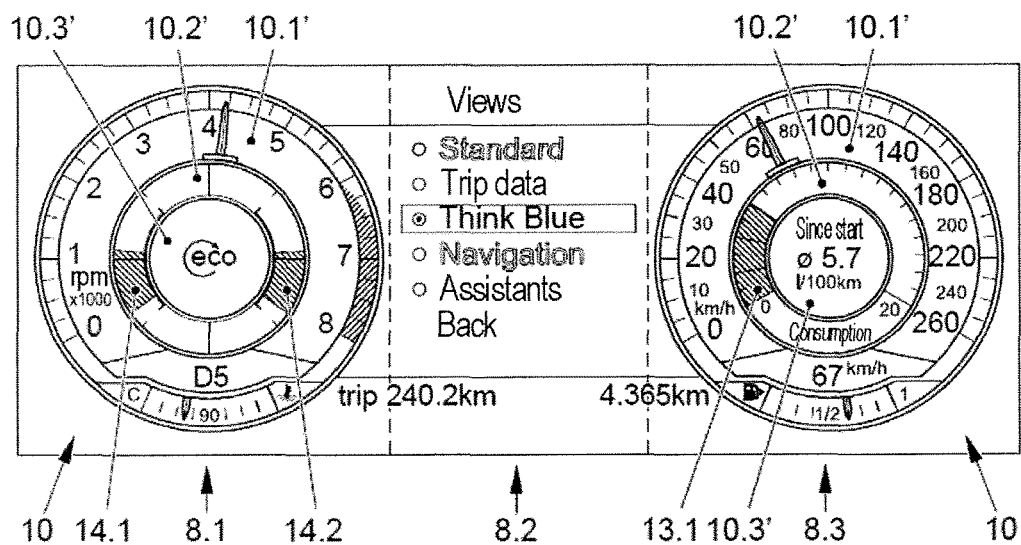

If by contrast the driver changes from the "classic" view, as shown in FIG. 4*a*, to the "think blue" view, the display represented in FIG. 4*c* is generated. In this case, the division of the display element 10 explained with FIG. 3*b* into an outer ring 10.1', a central ring 10.2' and the inner circular disk 10.3' is first generated again both in the first display region 8.1 and also in the third display region 8.3.

In the "think blue" view the user is in particular intended to be assisted to drive in an energy-saving manner. In this case two graphical elements 14.1 and 14.2 are displayed in the central ring 10.2' of the display element 10 of the first display region 8.1. It is indicated to the user in the inner circular disk 10.3' that the display is an ECO display.

Figure 5C:
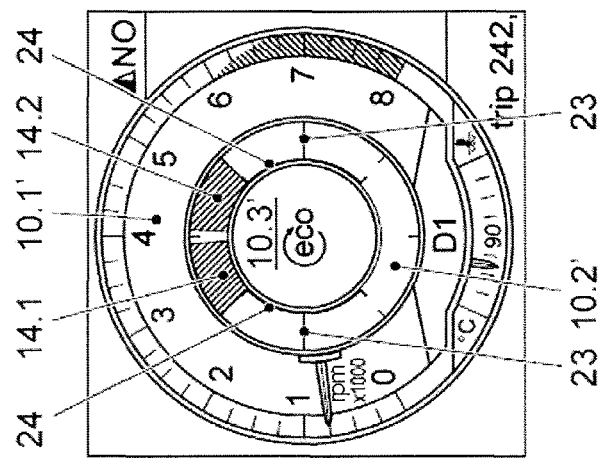
FIGS. 5a-5c show displays of the display element as they can be generated on the display surface shown in FIG. 4c.
Figure 5B:
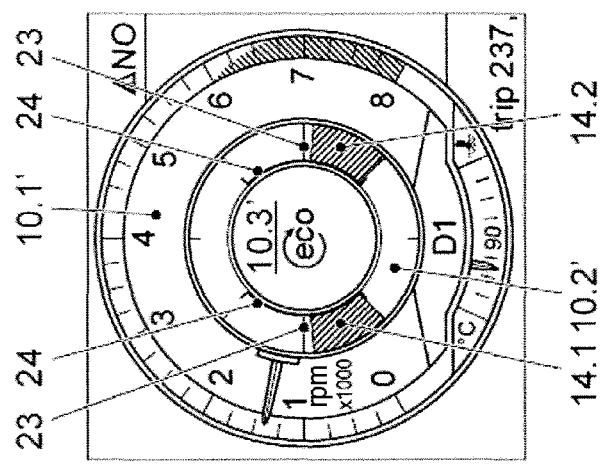
Figure 5A:
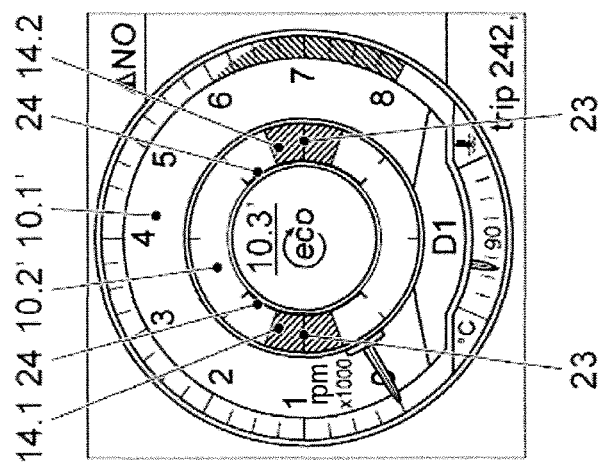

The generation of the graphical data in the view is explained with reference to FIGS. 5*a* to 5*c*.

First it is determined by the control device 4 whether the vehicle 1 is accelerating. If the vehicle 1 is not accelerating, as is the case for example in the park mode, a display is generated in the central ring 10.2' as shown in FIG. 5*a*.

A ring segment-like graphical object 14.1 and 14.2 is displayed in the central ring 10.2' on each side of the inner circular disk 10.3'. In addition, a marker 23 that extends horizontally through the center of the central ring 10.2' is displayed on both sides of the inner circular disk 10.3'. If the central ring 10.2' were a circular disk, the marker 23 would divide the central ring 10.2' into two semi-circular disks of equal sizes.

The ring segment-like objects 14.1 and 14.2 are disposed in the central ring 10.2' here such that they are bisected by the marker 23 if no acceleration is detected. Furthermore, a region 24 is displayed highlighted on both sides of the inner circular disk 10.3' in the central ring 10.2'.

If the vehicle 1 is moving off, a positive acceleration is detected. The vehicle 1 is gaining speed. This is shown by the two ring segment-shaped objects 14.1 and 14.2 being displaced downward to the same extent. During this the width and speed of the displacement of the ring segment-shaped objects 14.1 and 14.2 depend on the magnitude of the detected acceleration. If the driver pushes the gas pedal down to the floor of the vehicle for example, the vehicle 1 performs a kick-start. This is not energy-saving, however. It is signaled to the driver that the current acceleration has negative effects on an energy-saving manner of driving by a large downward displacement of the two ring segment-shaped objects 14.1 and 14.2. To be able to show the negative effects clearly, the ring segment-shaped objects 14.1 and 14.2 can be shown in a different color and/or pulsating if they leave the highlighted region 24.

If the driver operates the brake, the vehicle 1 loses speed. A negative acceleration of the vehicle 1 is detected. The ring segment-shaped objects 14.1 and 14.2 are displaced upward at the same time and to the same extent. During this the magnitude and speed of the displacement again depend on the degree to which the driver is braking. If for example he is carrying out full braking, the ring segment-like objects 14.1 and 14.2, as shown in FIG. 5*c*, are displaced fully upward until they almost come together. In this case they almost completely leave the region 24.

The driver is intuitively shown his manner of driving by the displacement of the ring segment-shaped objects 14.1 and 14.2. In the case of a calm and smooth manner of driving, the ring segment-shaped objects 14.1 and 14.2 are only slightly displaced. In the case of a rough driving manner with many acceleration processes, by contrast the ring segment-shaped objects 14.1 and 14.2 are moved back and forth in an unsteady manner in the central ring 10.2'. This not only results in a restless journey, but also in increased energy consumption. The "think blue" view can therefore be used as a training means for an energy-saving and anticipatory manner of driving.

In the "think blue" view, in particular the average consumption since the start is again displayed in a known way in the third display region 8.3.

Figure 4D:
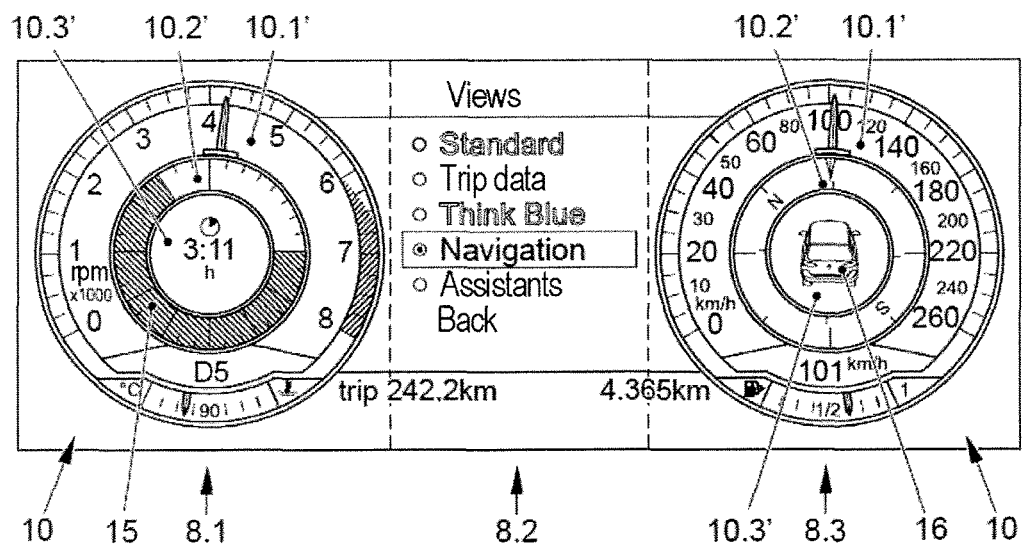

If the driver selects the "navigation" view starting from the "standard" view, the control device 4 activates the navigation device to get the desired data in the central ring 10.2' and the inner circular disk 10.3' of the first display region 8.1 and of the third display region 8.3 there. This is shown in FIG. 4*d*.

The remaining residual time to the target destination is then numerically displayed in the inner circular disk 10.3' of the first display region 8.1, for example. In the central ring 10.2' of the first display region 8.1, the time is graphically shown in a ring segment-shaped element 15. If the time to the destination reduces, then the length of the ring segment-shaped element 15 also reduces. As a result, the user is clearly shown how long his journey has to go. The numerical value displayed in the inner circular disk 10.3' is shown graphically in the central ring 10.2' by the ring segment-shaped element 15.

The vehicle itself 16 is displayed in the inner circular disk 10.3' of the third display region 8.3. A compass that indicates the compass directions is displayed in the central ring 10.2'. The display continuously shows the driver in which compass direction he is currently moving. If the vehicle 1 changes the direction of motion, then the compass rotates in the central ring 10.2' at the same time.

Figure 4E:
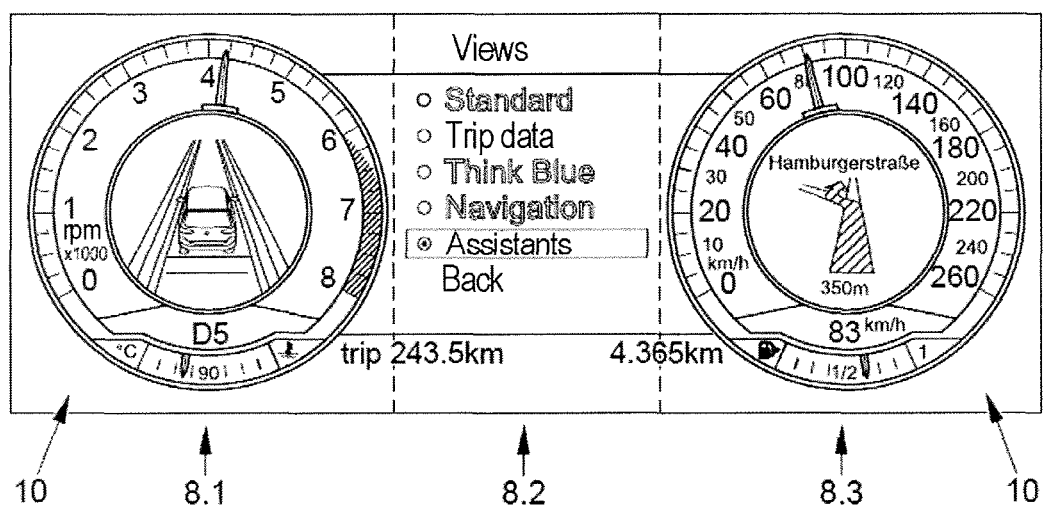

The user can also select the "assistant" view. A display is then shown to the driver as shown in FIG. 4*e*.

Because no values of a parameter should be displayed in the "assistant" view, the central ring 10.2' is omitted. The display element 10 is only divided into the outer ring 10.1' and the inner circular disk 10.3'.

The data memory 5, in which the current settings for driver assistance systems are stored, is activated by means of the control device 4. A graphical representation of the activated driver assistance system is then generated in the inner circular disk 10.3' using the data retrieved from the data memory 5. In the present example a reversing assistant is activated. The user is given an overview of the driver assistance systems activated in the vehicle 1 at one glance by the representation.

A route guide is displayed in the third display region 8.3 in the second sub-area 10.2 of the display element 10. By this means the driver can also have information for navigation displayed if he is not currently in the navigation view.

It is noted that a change between the different views is not only possible just from the classic display. A change between the views is also possible starting from the "driving data" view, the "think blue" view, the "navigation" view or the "assistant" view. Furthermore, a change from all the views into the "standard" view, i.e. the classic view, is also possible. Accordingly, the animation then runs in reverse.

Figure 6A:
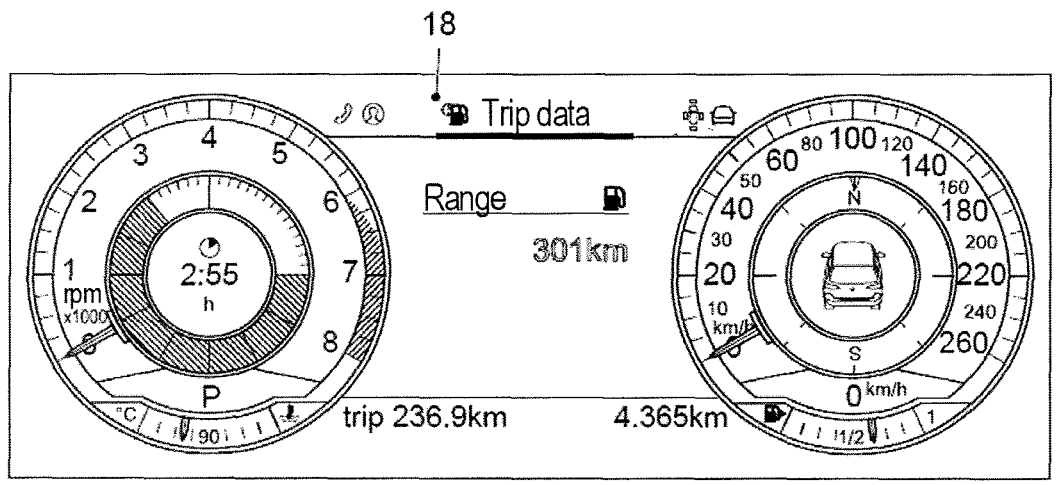
FIGS. 6a-6e show further displays on the display surface as they can be generated on the display surface by a further exemplary embodiment of the method.

To generally get to the "views" menu item, the option of a menu guide is given in the second display region 8.2 of the display surface 7. For this purpose, an operator menu 18 is displayed in an upper region of the second display region 8.2, as shown in FIG. 6*a*. The operator menu 18 comprises a plurality of menu items here that can be selected using the operating unit 9. Using the operator menu 18, the user can not only have currently present vehicle data displayed, but can also control external devices that are coupled to the vehicle 1. Furthermore, using the operator menu 18 the user can choose the parameter that is to be displayed in the central ring 10.2' and the inner circular disk 10.3' in the display elements 10 in the different views.

Figure 6B:
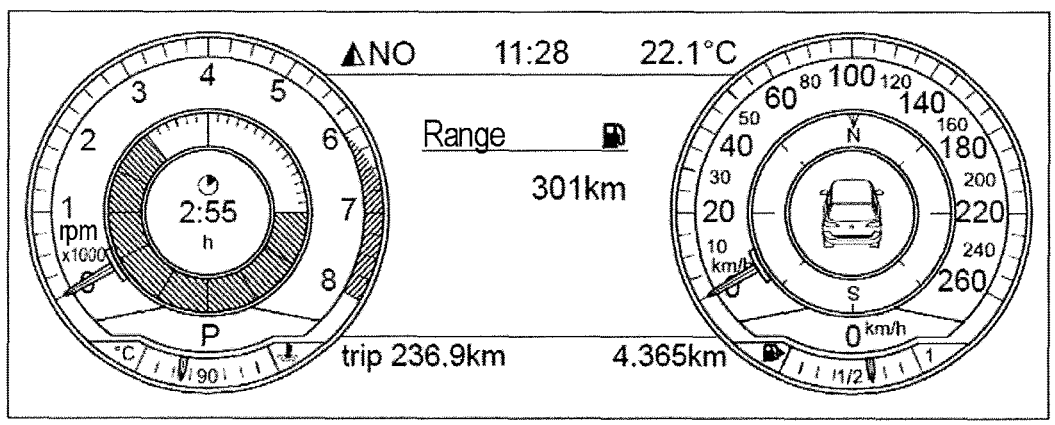
Figure 6C:
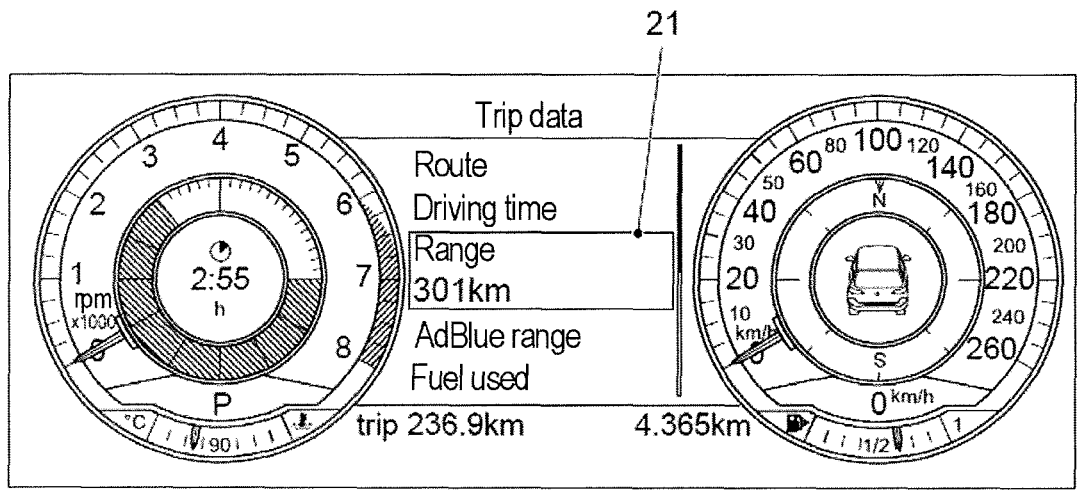
Figure 6D:
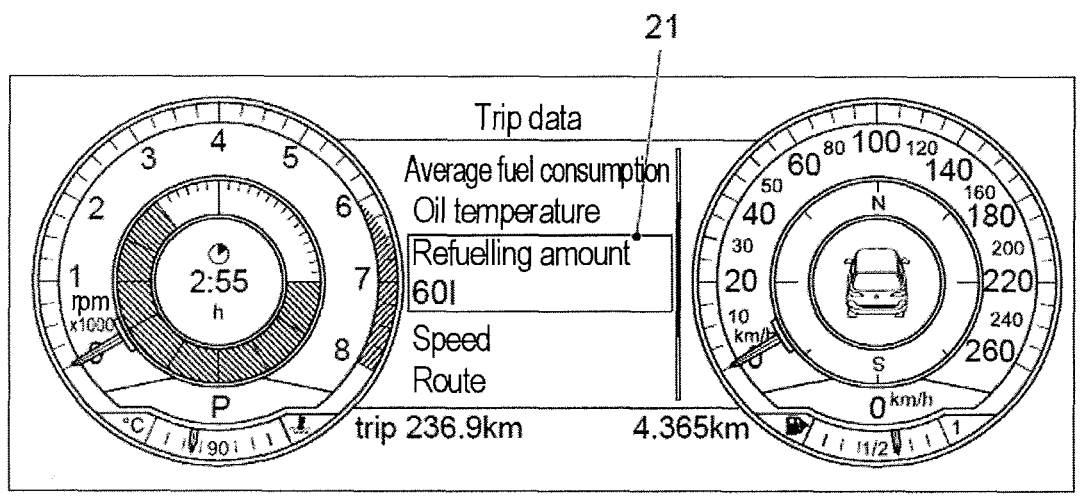
Figure 6E:
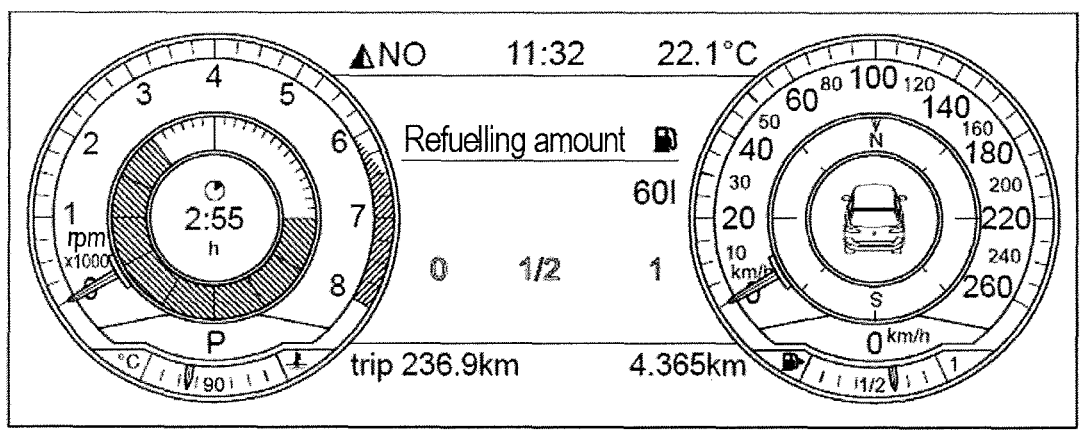

In the example of FIG. 6a, the user has selected the "driving data" menu item. The last parameter selected from the driving data, in the present case "range", is then displayed to the user. If the user does not carry out a further operating action within a specified time, the selected menu item range is shown increased. This is illustrated in FIG. 6b. If by contrast the user carries out an operating action, a list opens in which the different driving data are listed. In this case the user is shown by means of a marker 21 the item of driving data that is currently selected, as shown in FIG. 6c. Using an operating action, the user can generate a scroll mode by means of which he can scroll through the list. By a further operating action, the user can select another menu item, which is in turn then displayed to him in an enlarged form. This is shown in FIGS. 6c and 6d, in which the user wishes to have the "refueling quantity" menu item shown enlarged. If the user does not select another menu item and if the user selects the "driving data" view in the views, the value of the refueling quantity is displayed instead of the range as shown in FIG. 4b. This is regardless of which view is currently selected for the display surface.

Furthermore, the selected parameter is automatically associated with a view by the control device 4. This means that if a parameter that falls within the navigation category is selected using the menu, the same is associated with the "navigation" view and is then displayed in the central ring 10.2' and the inner circular disk 10.3' if the "navigation" view is selected.

In addition, the operator menu 18 can contain a menu item that is especially used for the configuration of the views. In this case the user can not only select the parameter from a list of parameters that should be displayed in the different views in the central ring 10.2' and the inner circular disk 10.3'. Rather, the user can also select the type of representation of the parameter in the inner circular disk 10.3' and the central ring 10.2'. For example, bar representations can also be displayed in the inner circular disk 10.3' instead of numerical values.

Referring to FIGS. 7a to 7f, the operation of the navigation system with the display device 2 is explained. If the "navigation" menu item is selected from the operator menu 18, a geographical map 20 is first displayed in the second display region 8.2 on the display surface 7, as is the rule with normal navigation systems. In this case the graphical object 19 represents the location of the vehicle 1 within the geographical map 20. The user is thus already given the ability to view the geographical map 20 in the combination instrument 25.

Figure 7A:
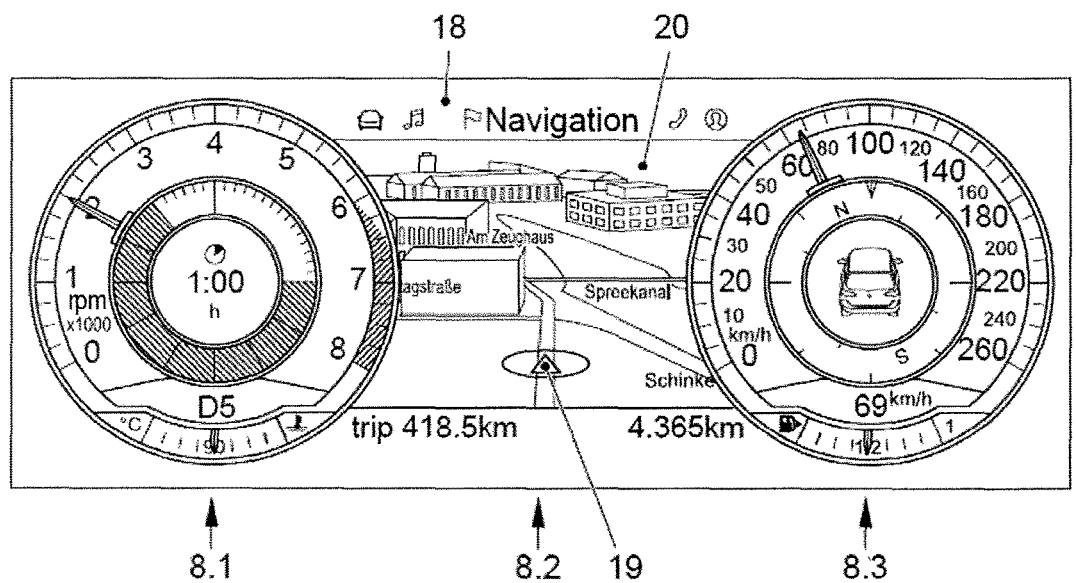
FIGS. 7a-11f show exemplary embodiments of displays on the display surface as they can be displayed on the display surface during the operation of an operating menu.
Figure 7B:
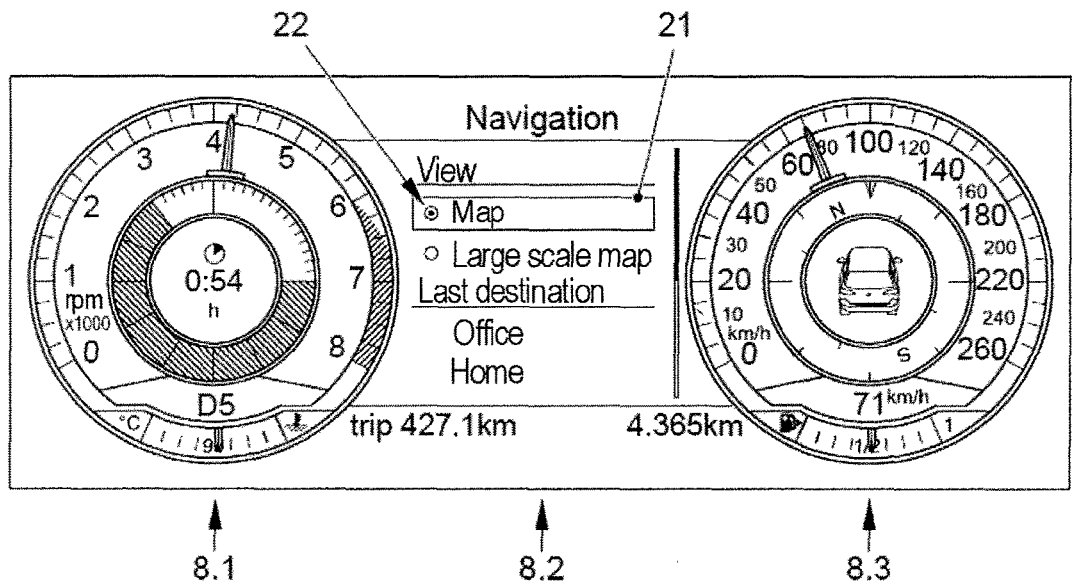

Settings for viewing the navigation system can be actioned using the second display region 8.2 here. If the user carries out a suitable operating action, which can be for example touching a touch screen in the central console of the vehicle, an operating action on a rotary push button, also in the central console of the vehicle, or an operating action on an operating element that is disposed in a multifunction steering wheel, then a menu is opened, as shown in FIG. 7b. Here the currently set view is displayed by means of the selection element 22. The marker 21 denotes where the user is currently within the list in this case. If the user wishes the setting for the map view not to change, then he selects the menu item "map" again by means of an operating action. Alternatively, an automatic time-out can also ensure that the currently selected map view is displayed again if no further operating action is carried out.

Figure 7C:
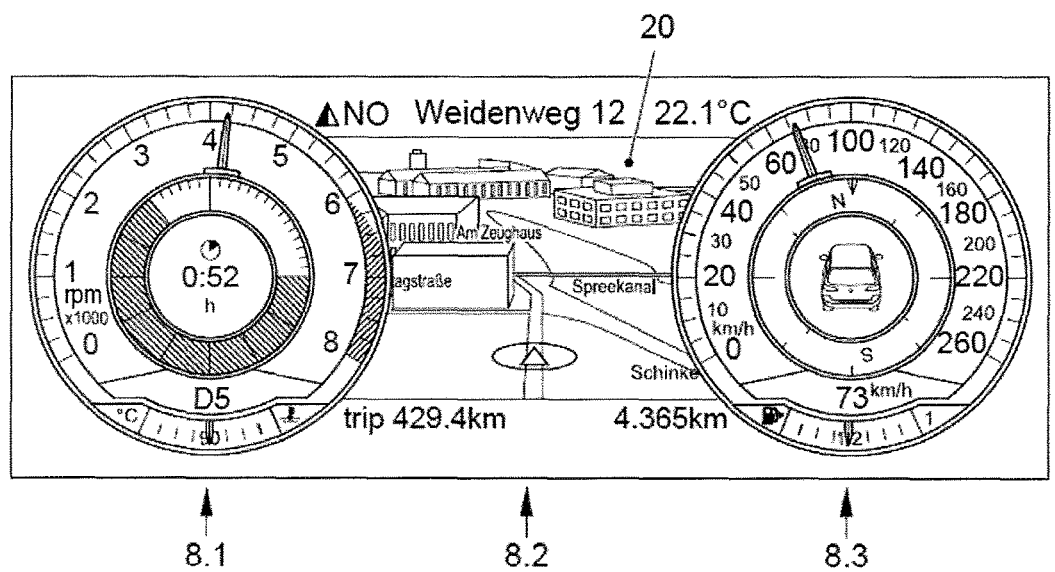
Figure 7D:
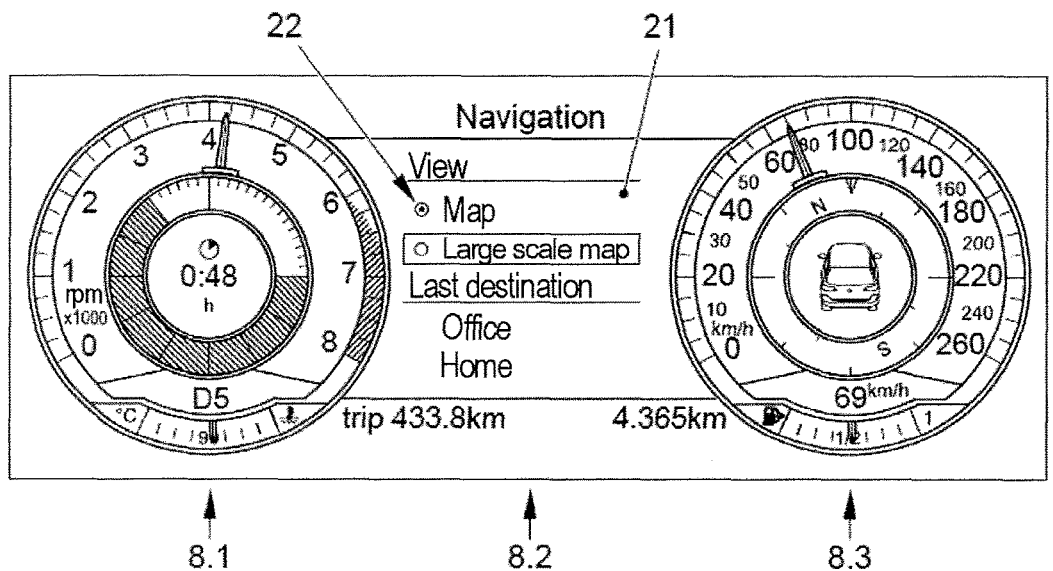
Figure 7E:
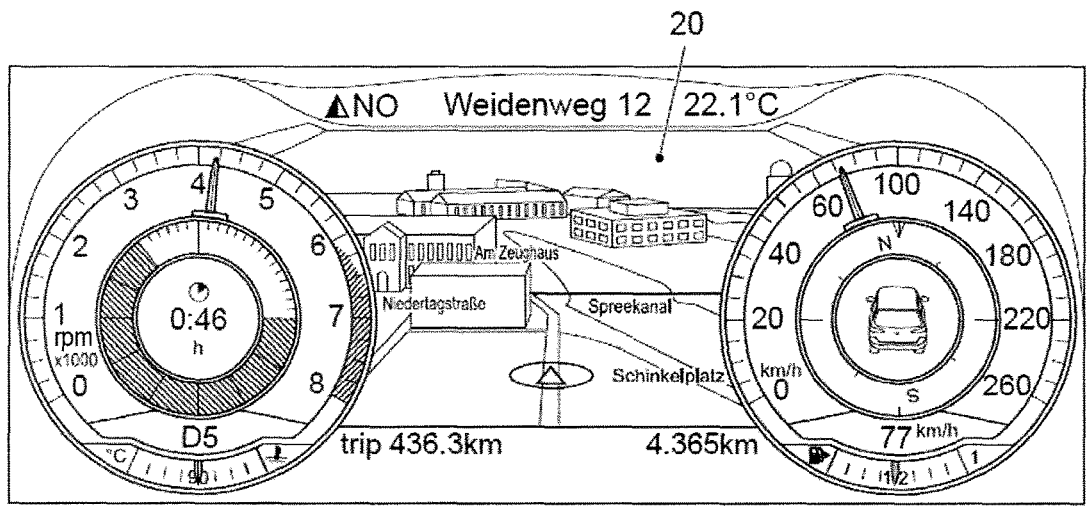
Figure 7F:
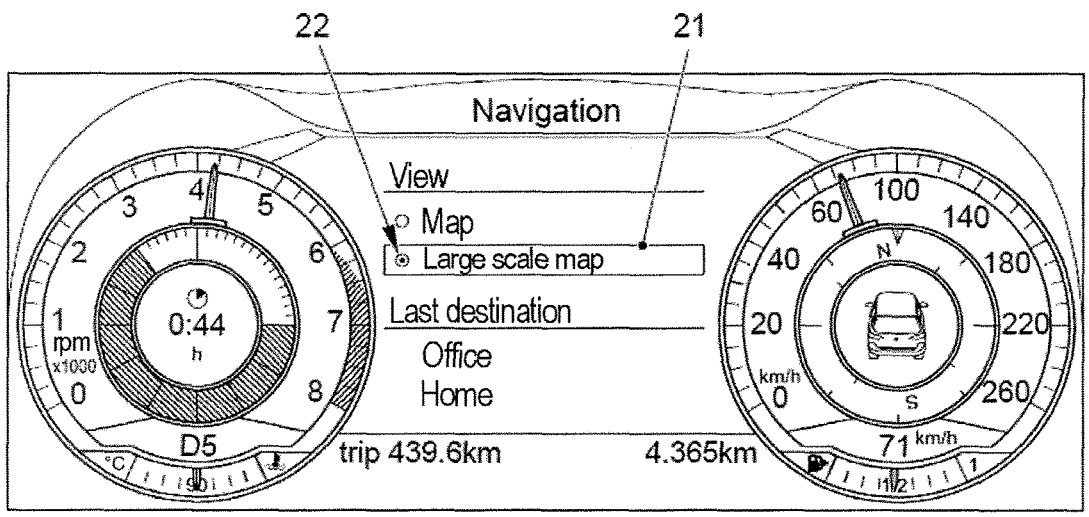

Consequently, the geographical map 20 is illustrated in the second display region 8.2 again. In the upper region, in which the operator menu 18 was previously displayed, the road name of the road is then displayed on which the vehicle 1 is currently located, as shown in FIG. 7c. Alternatively, the user can also change the view to the navigation view. If he selects the menu item "large map" for example by the marker 21, as shown in FIG. 7d, then a view as shown in FIG. 7e is generated. To provide a total space on the display surface 7 for the new representation, the display elements 10 in the display regions 8.1 and 8.3 are reduced by an animation. The scale of the geographical map 20 is not changed. Rather, the surroundings in which the vehicle 1 is located are shown in a larger radius on the space that is now available. As a result the user can be provided with a better overview of the surroundings of the vehicle 1. In the menu view the menu item "large map" is marked by the selection element 22, as shown in FIG. 7f.

Figure 8A:
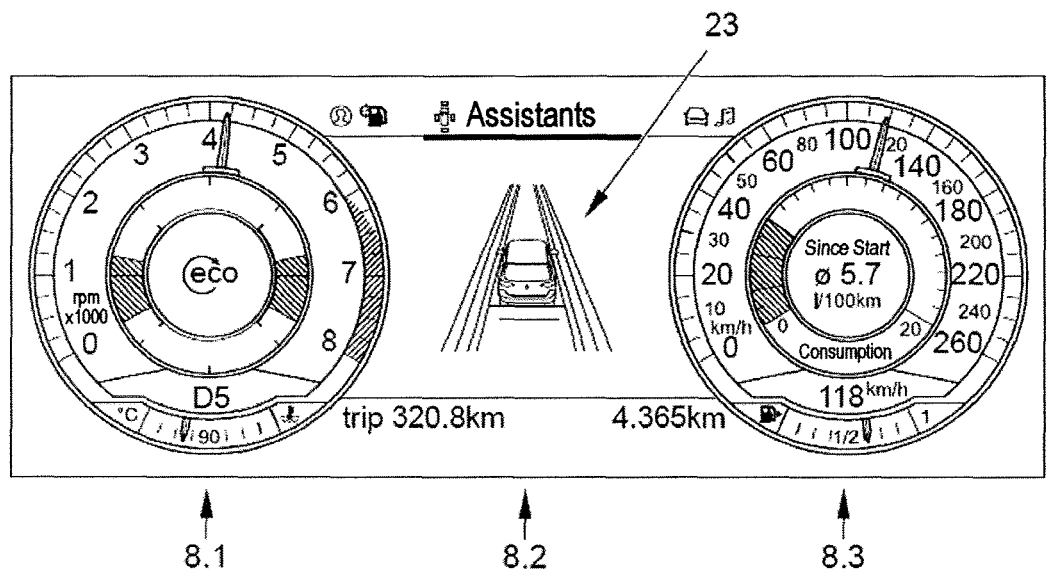

Using the "assistant" menu item of the operating menu 18, the user can select which driver assistance systems are to be activated or deactivated. In FIG. 8a by way of an example of this, a display is shown as it is generated on the display surface 7 if the user activates the "assistant" operating item by means of the operating unit 9. If he has not yet selected the "assistant" menu item, then the associated icon 23 is first shown in a reduced size. If the user does not carry out another operating action within a predetermined time, the "assistant" menu item is automatically selected.

Figure 8B:
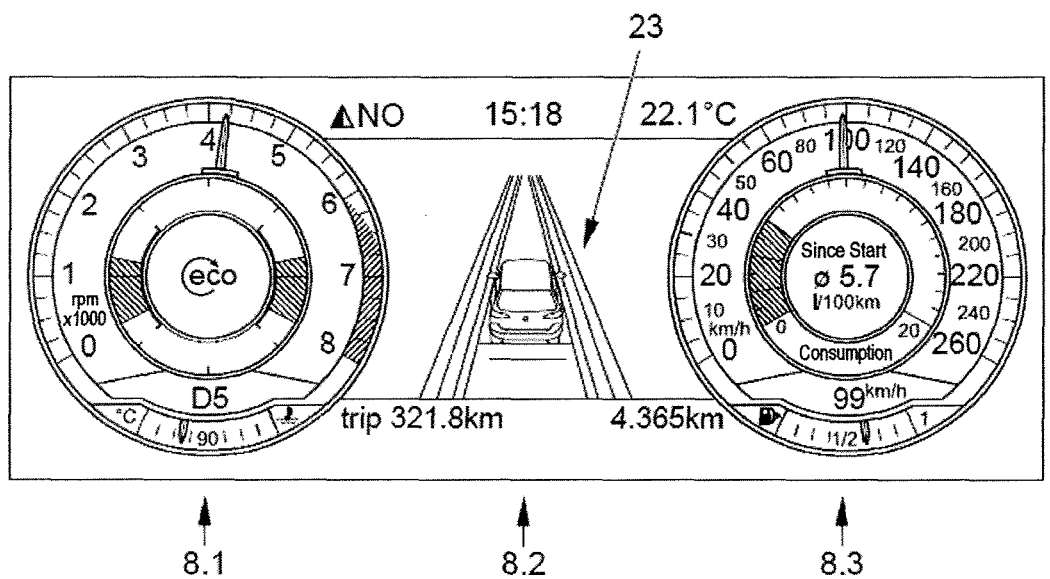
Figure 8C:
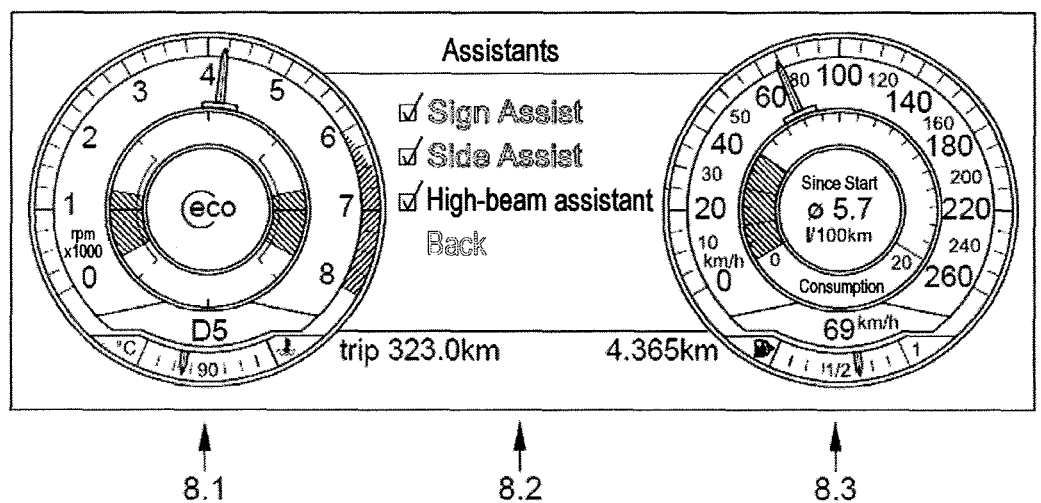

If the user selects the "assistant" menu item, a display according to FIG. 8b is generated in the second display region 8.2. The icon 23 is then shown enlarged in contrast to icon 23 in FIG. 8a. A list, by means of which the driver assistance systems to be deactivated or to be activated are indicated, can again be opened by a suitable operating action. This is shown in FIG. 8c. In the present example, all the driver assistance systems are activated.

Figure 9A:
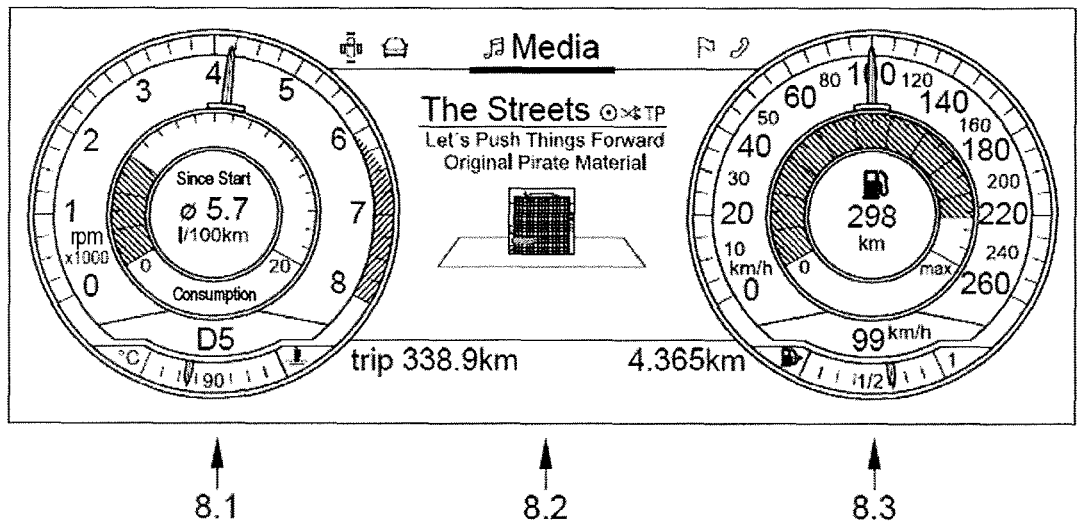
Figure 9B:
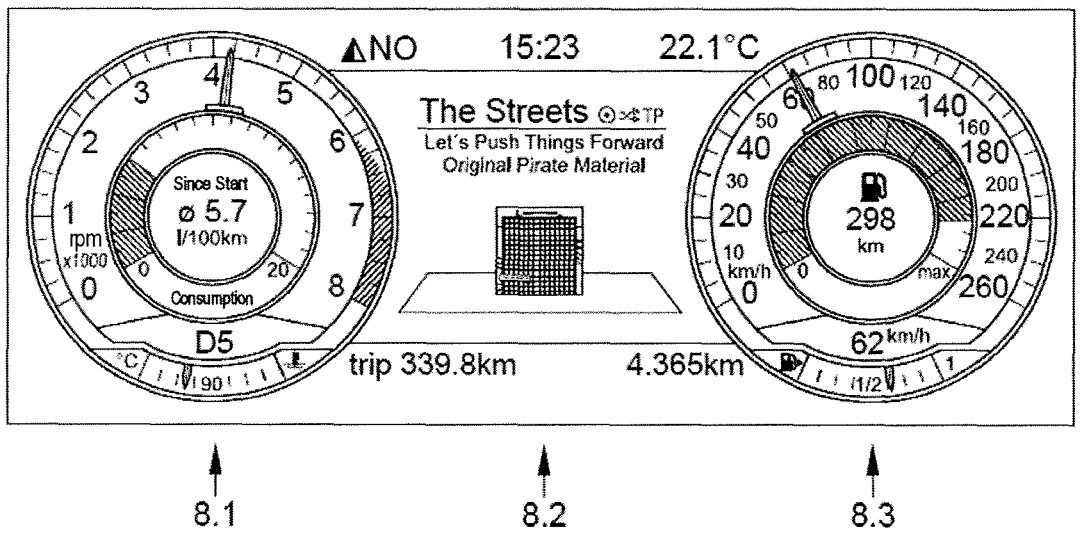
Figure 9C:
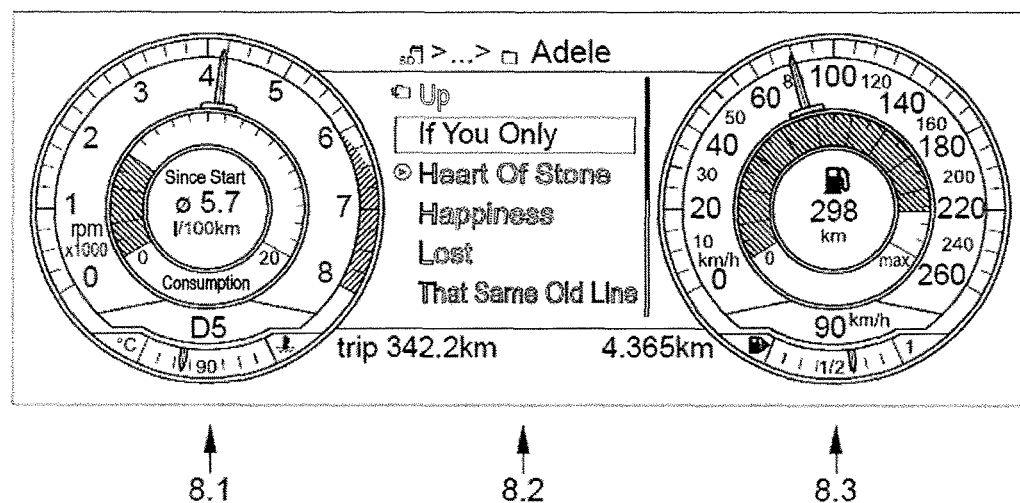

Referring to FIGS. 9a to 9c, a menu guide for a "media" menu item is explained. In this case graphical data can either be generated by the control device 4 activating an external device that is connected to the vehicle 1, for example a mobile telephone or a tablet computer of the user, and accessing the media libraries stored thereon, or by the control device 4 accessing an internal media system of the vehicle 1. In the event of a suitable operating action, the music title that was played last is then displayed first. If the user wishes to change the music title played, he can select a new music title from a list of music titles by means of operator actions.

Figure 10A:
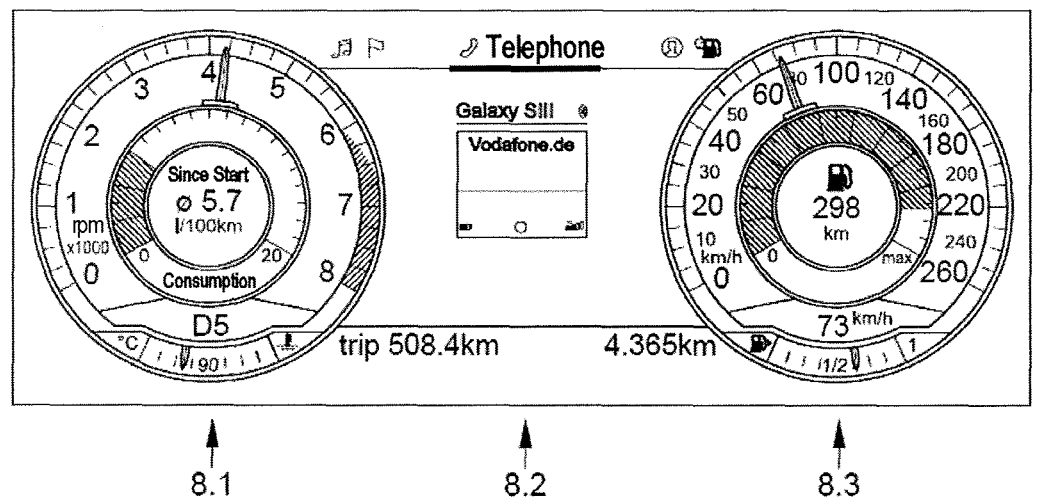
Figure 10B:
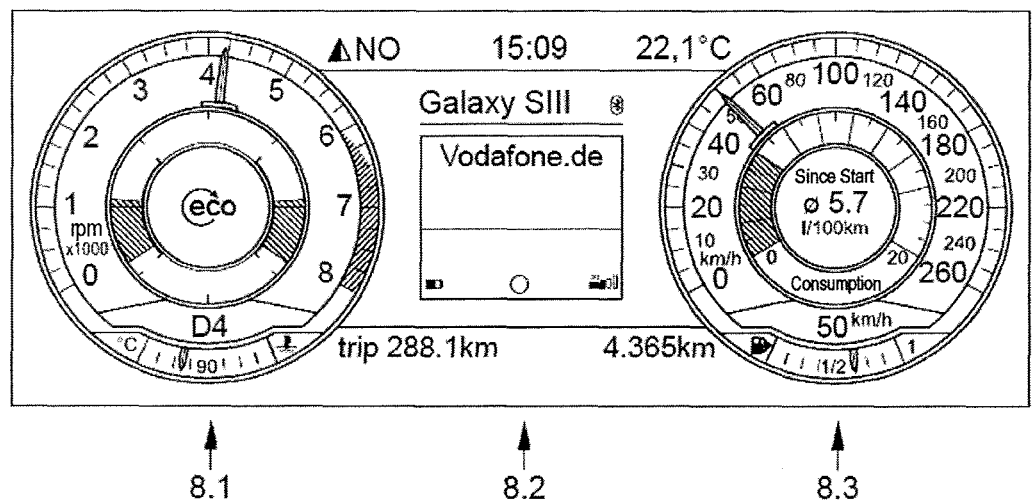
Figure 10C:
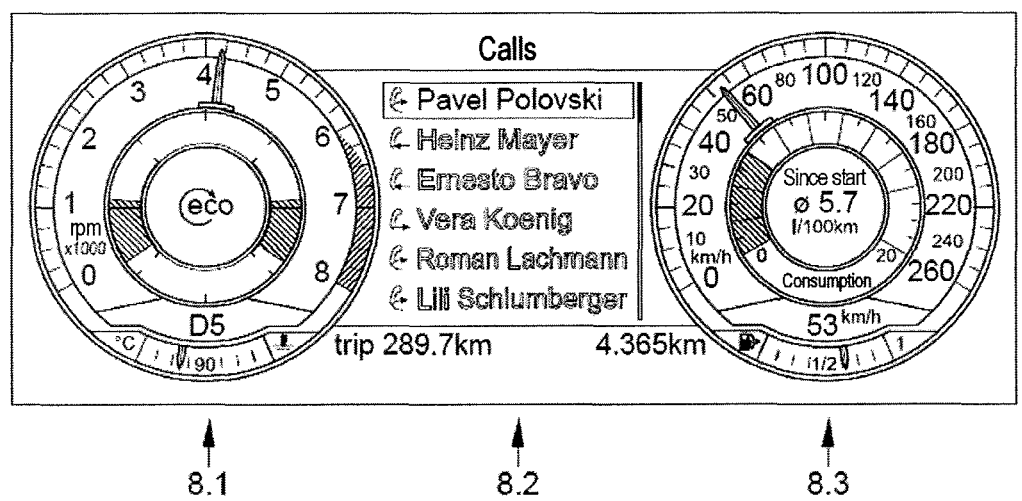

The control device 4 can also access the telephone book entries of a mobile telephone. As a result the driver can then make telephone calls via the vehicle 1. This is shown in FIGS. 10a to 10c.

The status of the vehicle constitutes a further menu item of the operating menu 18. In this case FIGS. 11a to 11f show examples of displays as they can be generated on the display surface 7 if warnings or information regarding the status of the vehicle are displayed.

Figure 11A:
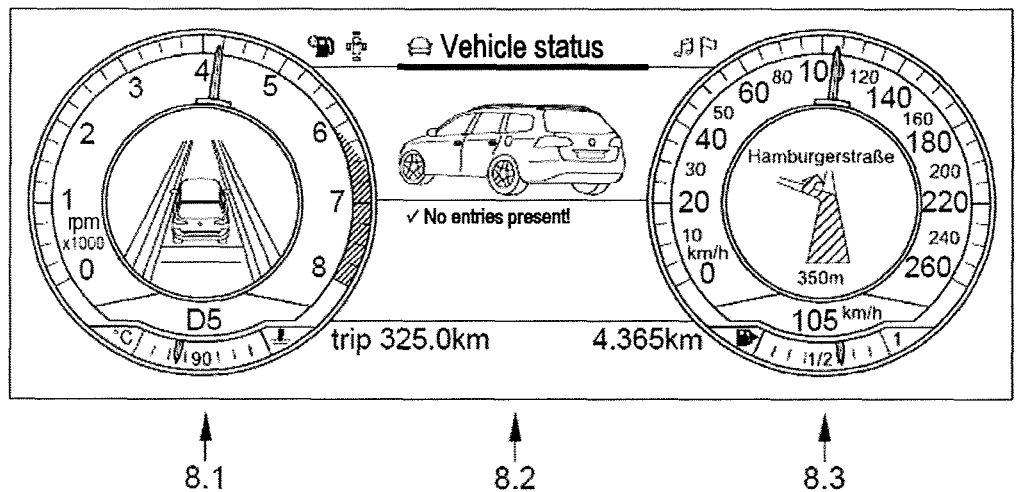
Figure 11B:
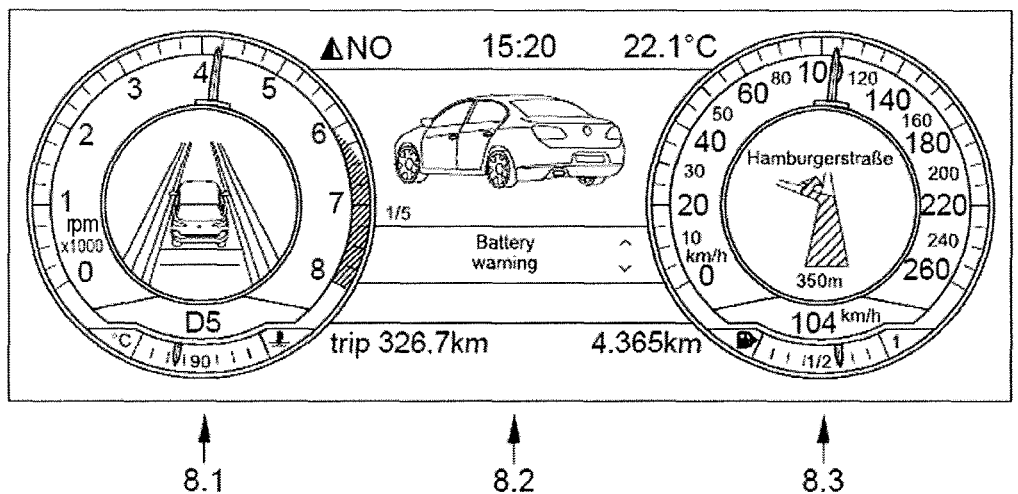
Figure 11C:
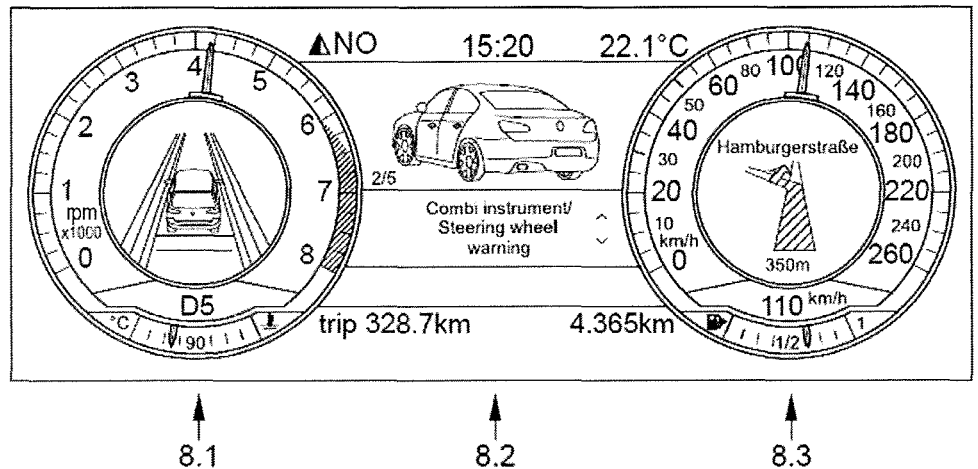
Figure 11D:
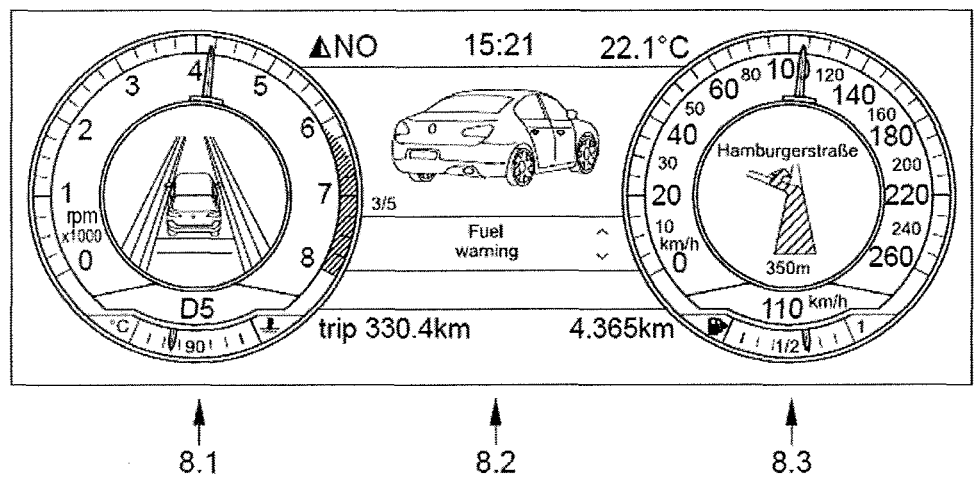
Figure 11E:
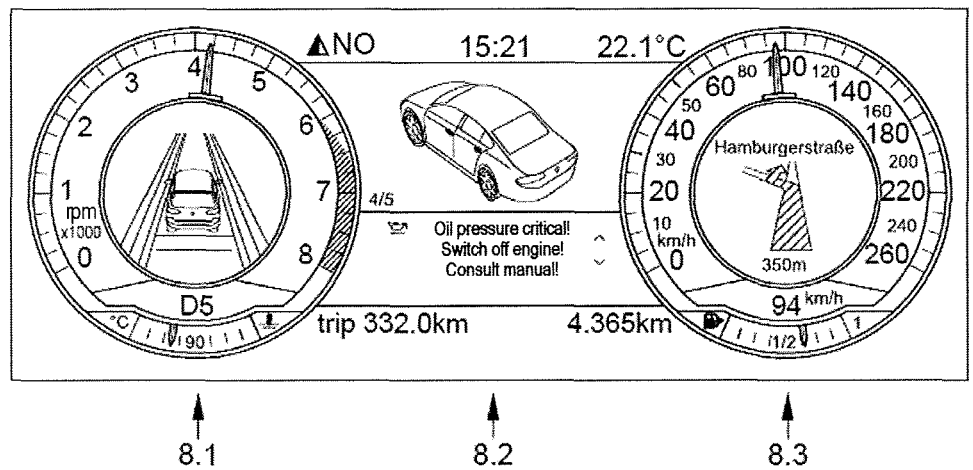
Figure 11F:
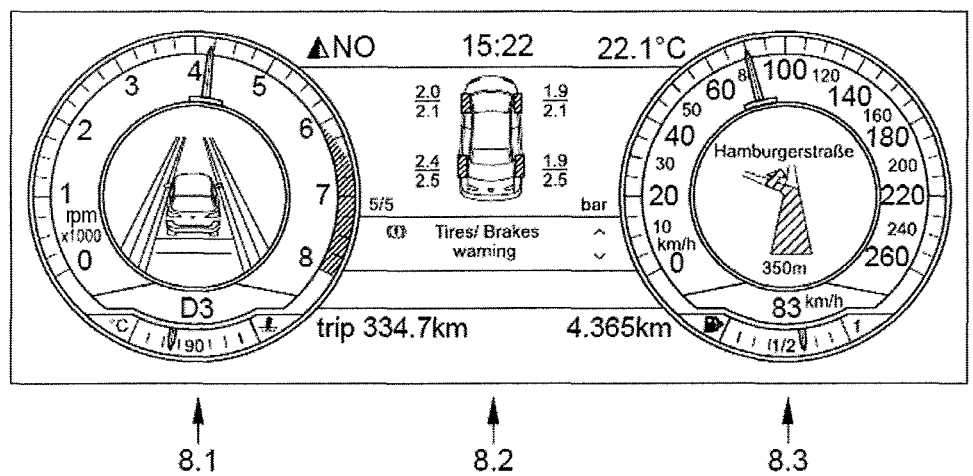

If there are no entries, then a display is generated according to FIG. 11a. In the event of a warning for the battery, for example for a low state of charge, a display is generated as shown in FIG. 11b. If the control device 4 determines a warning for the combination instrument 25 or the steering wheel, then the display surface 7 outputs a warning for the same. This is shown in FIG. 11c. In FIG. 11d the display is shown as it is generated if there is a fuel warning. If the oil pressure is in a critical region, so that the engine should be switched off, a warning indication is generated according to FIG. 11*e*. For a brake warning, for example in the event of worn brake linings, a display is generated according to FIG. 11*f*. The warnings shown in FIGS. 11*a* to 11*f* can for example also appear as pop-up displays on the display surface 7 at the time at which the problem is detected.

It is noted that the display in the second display region 8.2 is independent of the view that has been selected for the display regions 8.1 and 8.3. The displays of the vehicle-specific parameters in the sub-regions 10.3 and 10.2 or 10.3' and 10.2' of the dial instruments can be selected independently of the information displayed in the display region 8.2.

In addition, any information displayed following a predetermined time interval in which no operating action is detected can disappear from the second display region 8.2 of the display surface 7. No superfluous information is then displayed to the user in the second display region 8.2.

Referring to FIGS. 12*a* to 12*d*, the display as generated on the display surface 7 during the commissioning of the display surface 7 is explained.

A signal is first detected that signals that the display device is being put into operation.

Thereupon the graphical element 11, i.e., the pointer-shaped element with the pointer 11.1 and the pointer base 11.2, as well as the inner area 10.3 of the first display mode are generated on the display surface 7.

The pointer 11.1 and the pointer base 11.2 are displaced circularly about the inner area 10.3 from a defined initial position. During this the pointer 11.1 moves to a defined end position, which may lie at the provided end position of the scale marks of the scale 17. During the displacement of the pointer 11.1, the first sub-area 10.1 with the read-off marks of the scale 17 and the central area 10.2 are generated first. During this the different scale regions are only displayed when they have already been swept over by the pointer. This means that the first sub-area 10.1 with the read-off marks of the scale 17 and the second sub-area 10.2 only appear when the corresponding scale region has been swept over.

Figure 12A:
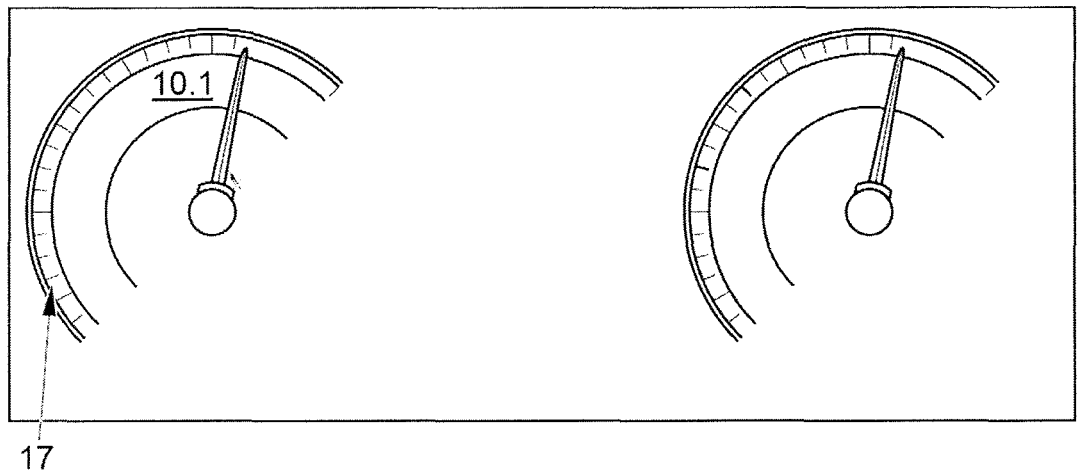
FIGS. 12a-12d show displays as they can be generated on the display surface when starting the display device on the display surface.
Figure 12B:
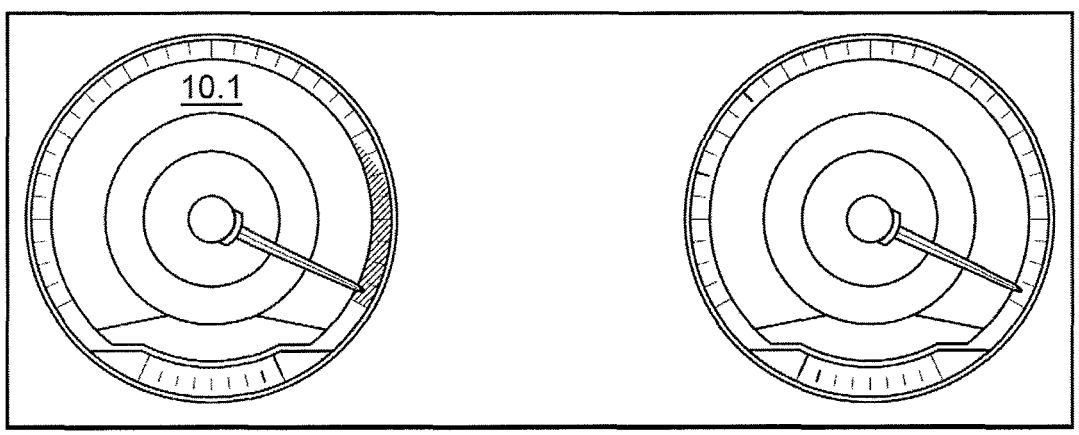
Figure 12C:
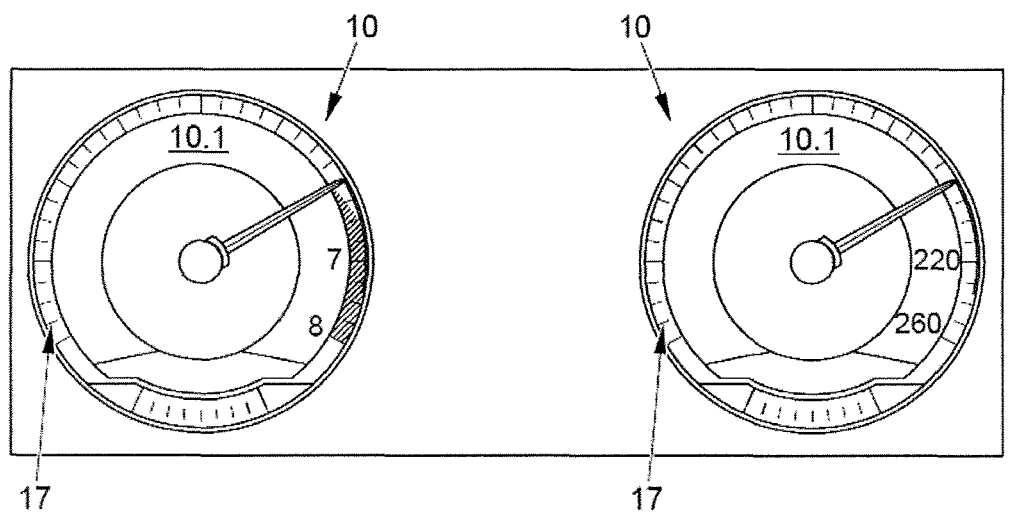
Figure 12D:
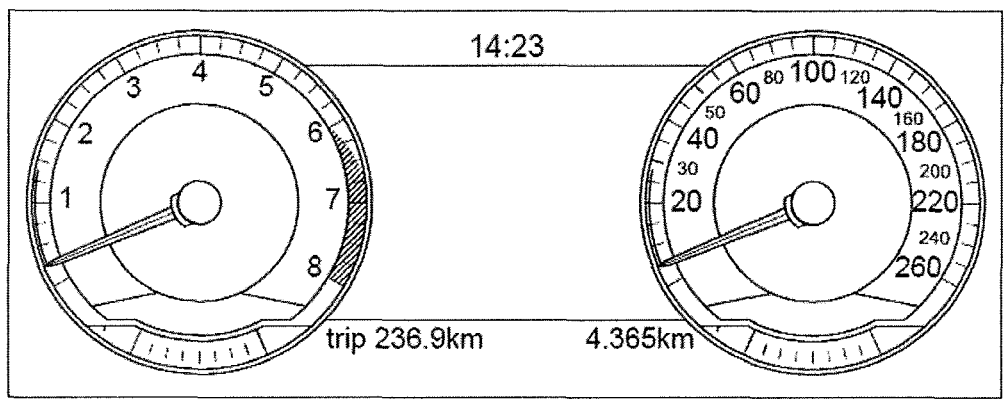

If the pointer 11.1 has reached the end position, the entire area of the display element 10 is displayed. Here it is to be noted that the read-off marks of the scales 17 are still without labels. The first displacement of the pointer 11.1 during this is shown in FIGS. 12*a* and 12*b*.

If the pointer 11.1 has reached the end position, it is moved back to the initial position again. In so doing the scale label is displayed during the second displacement. The scale label is displayed when the pointer 11.1 sweeps over the scale segment with which the corresponding label is associated during the reverse movement. Because the pointer 11.1 is moving back from the end position, i.e. from the end position of the read-off mark, to the initial position during the reverse movement, the read-off marks that lie on the upper part of the scale, i.e. for high speeds and high engine revolution rates, are labeled first.

If a signal is in turn detected that signals that the display device is to be switched off, the process that has been explained proceeds in the reverse direction.

Referring to FIGS. 13*a* to 13*d* and 14*a* and 14*b*, a further exemplary embodiment of a method is explained.

Figure 13A:
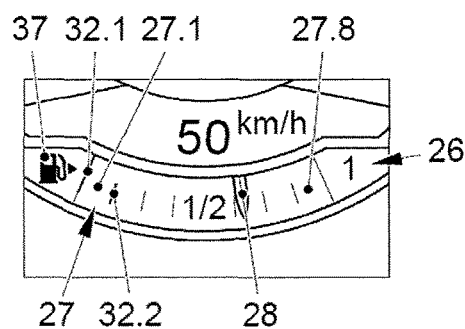
FIGS. 13a-13d show displays of an energy reservoir indicator as it can be generated on the display surface by a further exemplary embodiment of the method.
Figure 13B:
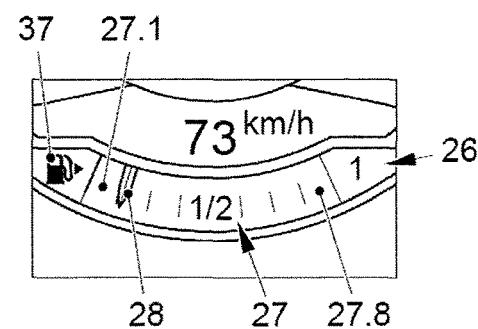

There is a region 26 on the display surface 7 in which an indication of the energy reserve still remaining stored in an energy storage means is displayed. The current energy reserve is constantly displayed on the energy level indicator. For this purpose, the same is determined by means of a sensor at all times during the operation of the vehicle. The sensor transmits the determined value to the control device 4. The same in turn then generates the display shown on the display surface 7 in the region 26, as shown in FIG. 13*a*.

The energy level indicator comprises a scale 27. The scale 27 shows possible values of the amount of energy that is in the energy reserve storage means. In this case the "1" refers to a full energy reserve storage means and the "½" to a half-full energy reserve storage means. The scale 27 is divided into a plurality of scale segments 27.1 to 27.8. In the present example, the scale comprises nine scale marks 32.1 to 32.9. There is a scale segment 27.1 to 27.8 between each two scale marks 32.1 to 32.9 in each case. The determined current value is displayed on the scale 27 by means of the graphical element 28. In this case the graphical element 28 is designed as a pointer whose tip shows the determined current value. The pointer 28 is shown in the color red for example.

On the left beside the scale 27 a graphical object 37 is displayed that shows that the scale 27 displayed in the region 26 is the energy level indicator.

A predefined critical value for the energy reserve is placed in the data memory 5. In the present case this has the value corresponding to the filling of the energy reserve storage means to the second scale mark 32.2. In this case the predefined critical value is already marked in the scale 27 by displaying the scale mark 32.2 in a different color from the remaining scale marks, for example in red. If the graphical element 28 reaches the scale mark 32.2, the tank is only one-eighth full. A critical value of the energy reserve is defined here as the value at which the user should consider replenishing the energy reservoir.

If the energy reserve falls below its critical value, the display is changed in the region 26 on the display surface 7.

Figure 13C:
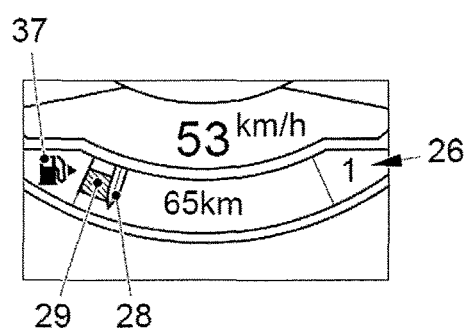

If the pointer 28 sweeps over the second scale mark 32.2 in the direction of the scale mark 32.1, as shown in FIG. 13*c*, an elongated graphical object 29 is displayed in the scale segment 27.1 that lies between the scale marks 32.1 and 32.2. As a result the scale segment 27.1 is shown highlighted. In this case the scale segment 27.1 represents a critical range of values of the amount of energy. The elongated graphical object 29 can have the length of the scale segment 27.1 here. In addition, the color of the graphical object 37 can be changed.

The remaining scale marks 32.3 to 32.9, and hence also the scale segments 27.2 to 27.8, are then no longer displayed. Besides the scale segment 27.1 shown highlighted, a free area 33 is shown. To accentuate the elongated object 29 and hence display it clearly visibly, it can have a warning color, in particular the color red.

If the elongated graphical object 29 has the color red, the pointer, which also has the color red, is no longer clearly distinguishable in the scale segment 27.1. The pointer 28 is then also displayed in a different color, in particular a color that is significantly different from the color of the critical range of values. This not only enables the pointer 28 to be clearly perceived. If a plurality of graphical elements on the display surface 7 change color, the change of the display can be seen more clearly.

The residual range that can be achieved with the amount of energy still stored in the energy reservoir can also be displayed in the free area 33. This is calculated by the determination unit 31 if the amount of energy is below the critical value. In doing so it should be taken into account that the residual range of the vehicle 1 is not solely dependent on the amount of energy still stored. Rather, the residual range is also dependent on the current manner of driving and the settings of vehicle functions, in particular a climate control function. Thus the critical value can always be defined as the value of the energy reserve if the second scale mark 32.2 is swept over toward the scale mark 32.1. However, the residual range that is then displayed can be different depending on the manner of driving and vehicle settings.

For example, the residual range is 65 km if the amount of energy falls below the critical value.

If the driver drives on without filling the energy reservoir of the vehicle 1, the amount of energy stored in the energy reservoir falls further.

If the amount of energy falls below a further predefined critical value within the critical range of values, the elongated graphical object 28 starts to pulsate. The light intensity of the elongated graphical object 28 is thus variable over time. By this means it is signaled to the user that he must now urgently fill the energy reservoir.

Figure 13D:
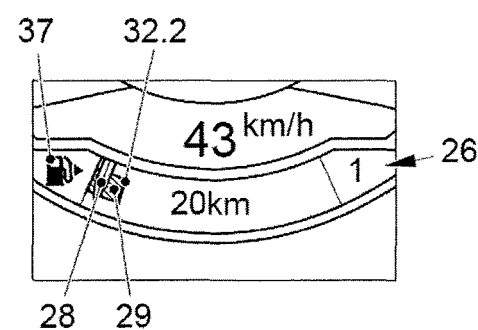
Figure 14A:
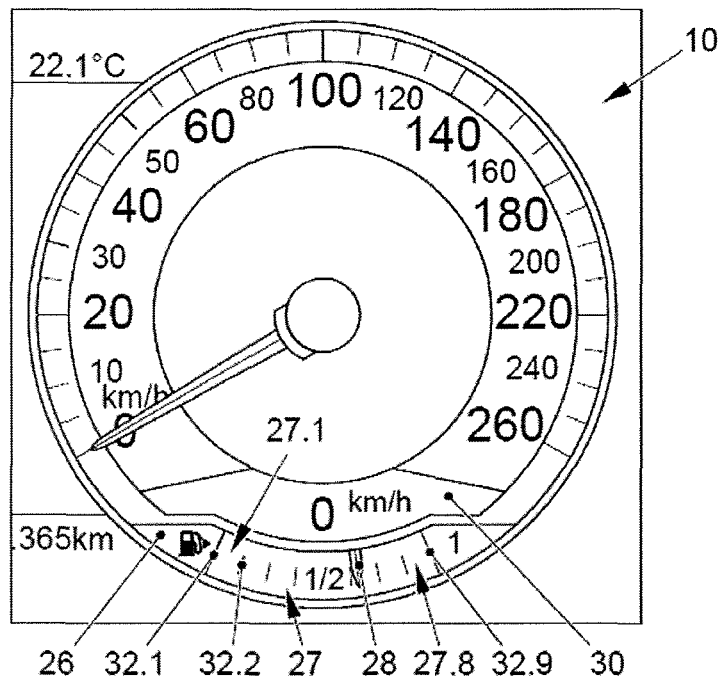
FIGS. 14a-14b show an integration of the energy reservoir indicator in a display element.
Figure 14B:
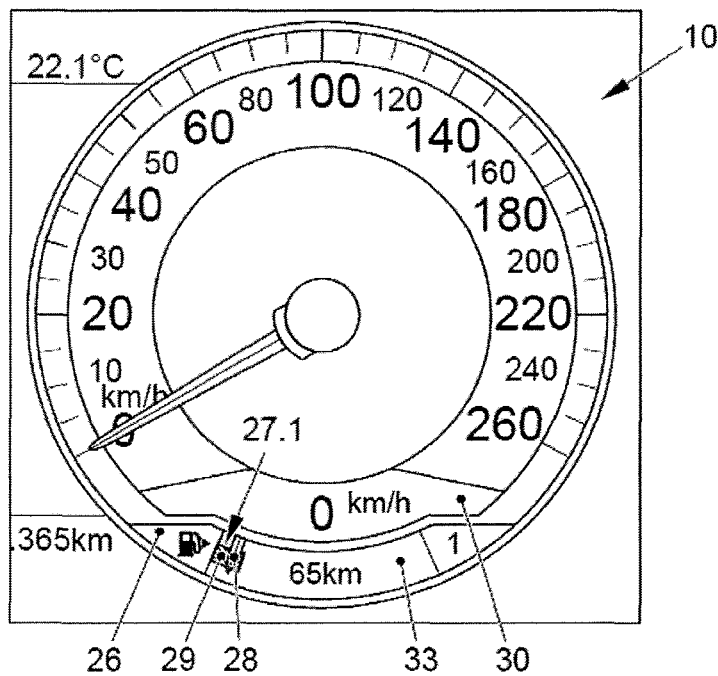

The amount of energy can fall below the second critical value, for example, if the energy reserve is only a quarter of the length of the elongated graphical object 29. The residual range can then for example be 20 km, as shown in FIG. 13d.

The region 26 can in particular represent a conventional fuel display. The energy reserve can for example be stored in a normal tank for gasoline or diesel. Alternatively, the energy reserve can also be stored in a traction battery that is responsible for driving the vehicle 1.

The region 26, in which the energy reserve is displayed, can also be integrated within a display element 10, as is explained with reference to FIGS. 3a and 3b. The fuel display can for example be integrated within the display element 10, which the speed display provides. The display element 10 comprises a numerical speed display 30 in addition to a display of the speed on the scale 17. The region 26 is disposed underneath the numerical speed display 30. The integration of the region 26 within such a display element 10 is shown here in FIGS. 14a and 14b.

In addition, a display element 10 with an integrated fuel display can be displayed on a display surface 7 that is divided into the three display regions 8.1 to 8.3. An area can then additionally be displayed in a further region on the display surface 7, the light intensity of which being varied with time if the amount of energy falls below the critical value or the further critical value. The area can in particular be displayed separately from the region 26. The driver can then be more easily made aware that the energy reserve has fallen below a critical value if his view is not currently directed toward the part of the display surface 7 in which the region 26 is disposed.

Figure 15A:
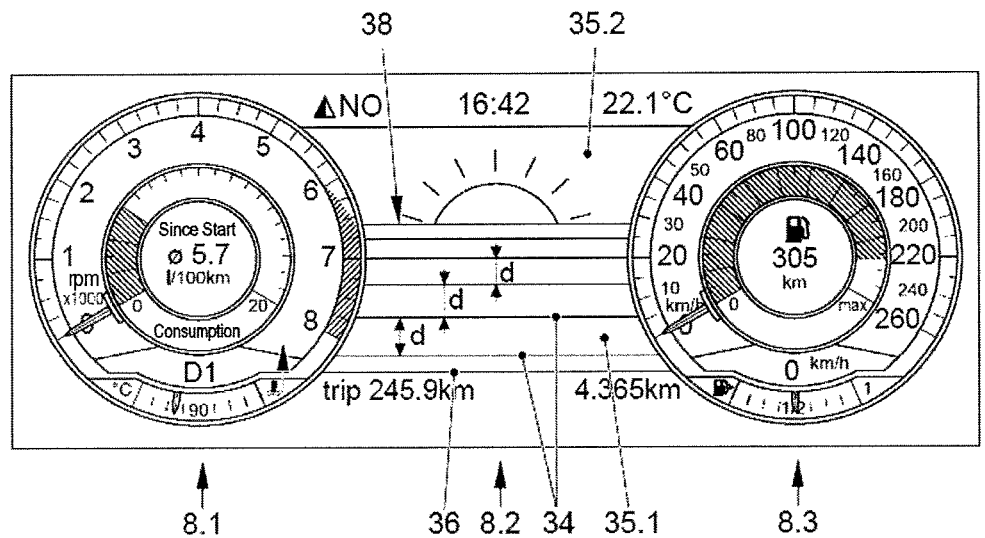
FIGS. 15a-15c show displays as they can be generated on the display surface by yet another exemplary embodiment of the method.
Figure 15B:
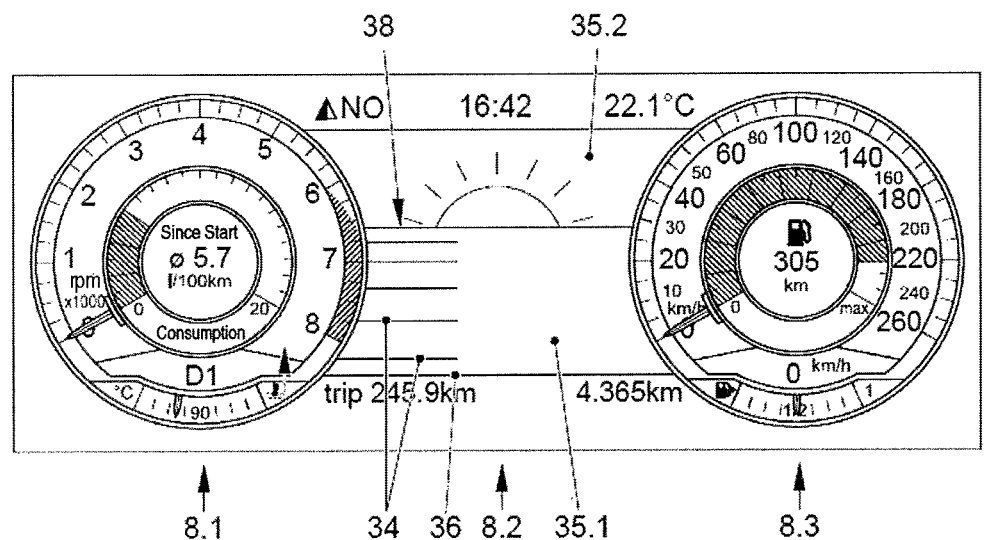
Figure 15C:
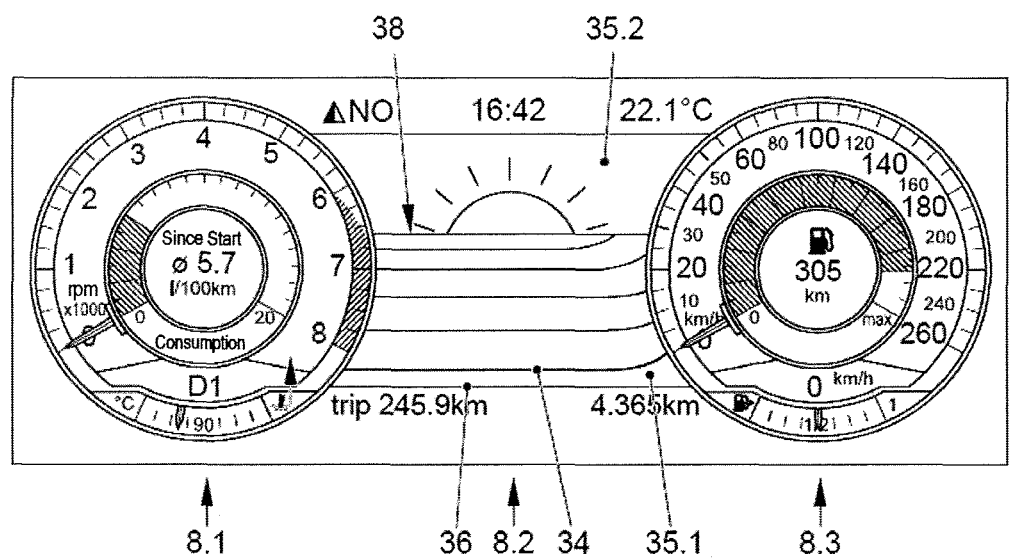

Referring to FIGS. 15a to 15c, a further exemplary embodiment of a method is explained.

In this case the FIGS. 15a to 15c relate in particular to displays as they can be generated in the second display region 8.2 on the display surface 7 during the process. However, the display according to FIGS. 15a to 15c can also be generated on every other display surface and is thus not limited to the display surface 7 of the device 3.

The starting point of the method is that the vehicle 1 is in the park mode, and is thus not moving. A display is generated on the display surface 7 as shown in FIG. 15a.

A region 35.1 is displayed on the display surface 7 in this case. The region 35.1 is delimited below by a first graphical boundary 36 and above by a second graphical boundary 38, which is also referred to as the horizon 38. The region 35.1 is thus underneath the horizon 38. In this case the horizon 38 provides a graphical separation of a graphically illustrated road and of a graphically illustrated sky. The region 35.1 beneath the horizon 38 constitutes the graphical representation of the road here. In this case the road does not have to be represented realistically. The region 35.2 above the horizon 38 constitutes a schematic representation of the sky, which also does not have to be illustrated realistically.

If the vehicle 1 has a function by means of which the currently prevailing weather can be determined, this can be shown in the region 35.2, for example by coloring the region 35.2.

In the region 35.1, a plurality of mutually separated horizontal lines 34 extending parallel to the horizon 38 are displayed beneath the horizon 38.

If the vehicle 1 starts moving, the speed vF of the vehicle 1 is determined. This is generally detected for a general speed display, for example as displayed in the display element 10 of the second display region 8.2 of the display surface 7, and can also be used for the display in the region 35.1.

A speed vL with which the horizontal lines 34 are moved is then calculated from the determined speed of the vehicle vF. The speed vL of the horizontal lines 34 is for example proportional to the speed of the vehicle vF. For example, the speed vL can be calculated using the relationship $vL=\alpha \cdot vF$. To prevent the horizontal lines 34 on the display surface 7 from blurring at high vehicle speeds vF, the speed vL should have a lower value than the speed of the vehicle vF. The proportionality constant $\alpha$ thus lies between 0 and 1. In particular, the proportionality constant $\alpha$ is smaller than 0.8. The proportionality constant $\alpha$ can be calculated or determined by means of an algorithm.

If it is detected that the vehicle 1 starts moving, the horizontal lines 34 start to move across the region 35.1. In doing so the horizontal lines 34 move downward away from the horizon 38 in the direction of the first boundary 36 opposite the horizon 38, which terminates the region 35.1 at the bottom. If a horizontal line 34 has reached the boundary 36, it is no longer displayed in the region 35.1. At the same time a new horizontal line 34 is displayed at the horizon 38.

During this, the distance d between each two adjacent horizontal lines 34 in the direction of motion is larger. As a result there is a perspective impression whereby the horizon 38 is displayed in the distance. By the displacement of the horizontal lines 34 and the ever increasing distance d between two horizontal lines 34 with the distance from the horizon 38, the driver gets the impression that he is driving over the horizontal lines 34. This display produces a particular driving sensation in the vehicle 1.

If the vehicle 1 gains speed, according to the relationship stated above the displacement of the lines 34 is also faster. The measured speed of the vehicle vF is thus directly converted into the speed vL of displacement of the horizontal lines 34 in the region 35.1 on the display surface 7.

The displacement of the horizontal lines 34 on the display surface 7 is in particular advantageous in driving situations in which the driver does not notice that the vehicle 1 is moving. This can for example be the case if the vehicle 1 comprises an automatic transmission. Vehicles 1 with automatic transmissions will roll away as soon as the driver takes his foot off the brake pedal or does not press sufficiently hard on the brake pedal. The driver is shown that the vehicle is rolling by means of the display of the horizontal lines 34. The driver can advantageously be made aware more rapidly that the vehicle is rolling by means of the display.

In addition, a steering angle of the steering wheel of the vehicle 1 can be detected by the detection unit 6. The representation of the horizontal lines 34 can also be carried out depending on the steering angle. For this the steering angle is defined as zero if the wheels of the vehicle adopt a straight ahead position. In the case of a negative steering angle, the vehicle 1 is making a left turn and in the case of a positive steering angle a right turn.

The display generated on the display surface 7 depending on the steering angle is explained with reference to FIGS. 15b and 15c for the example of a left turn.

If a negative steering angle is detected, the horizontal lines 34 are shortened to the left depending on the magnitude of the steering angle. This is shown in FIG. 15b. In this case the horizontal lines 34 are shown shorter, the larger the steering angle. In the case of a right turn, the horizontal lines 34 are correspondingly shortened to the right.

Alternatively, the course of the horizontal lines 34 can also be changed, as shown in FIG. 15c. In the case of a negative steering angle, the horizontal lines 34 can be given a left curvature, wherein the degree of the curvature is dependent on the magnitude of the steering angle. In the case of a right turn, the horizontal lines 34 are accordingly shown curved to the right.

In the case of tight turns, the driver rapidly loses the overview over the current state of the wheels of the vehicle. Although the steering wheel can be in a perceived straight ahead position, this does not however mean that the wheels of the vehicle are also actually directed straight ahead. By means of the representation of the steering angle using a graphical variation of the horizontal lines 34, the driver is shown whether the wheels of the vehicle 1 are in a straight ahead position or not. In addition, again a particular driving sensation is generated within the vehicle 1.

If the driver selects reverse gear and drives backward, the direction of motion of the horizontal lines 34 is reversed. The horizontal lines 34 then move from the first boundary 36 in the direction of the horizon 38, i.e. of the second boundary. If a horizontal line 34 disappears at the horizon 38, a new horizontal line 34 is displayed at the first boundary 36. In addition, the distance d between the lines can then increase toward the horizon 38.

The direction of motion of the vehicle 1 is thus detected by means of the detection unit 6, wherein the direction of motion of the horizontal lines 34 is then determined depending on the direction of motion of the vehicle 1.

The embodiments of the method described in the detailed description are not restricted to a display surface 7 with three display regions 8.1 to 8.3. Rather, each display can also be displayed on its own on an optional display surface or in combination with any other displays.

A display device for a vehicle is known from DE 43 07 367 A1 that comprises a display screen with a region in which freely selectable state information that is called up by means of operating elements can be displayed in a different form that can be selected by the operator.

A combination instrument for a vehicle is known from DE 199 02 136 B4 comprising two display panels, wherein the second display panel has a lower luminance than the first display panel and the two display panels are combined with each other. The combination instrument comprises a darkening filter whose transparency is selected to be high in wavelength ranges corresponding to a wavelength range of the light emitted by the second display panel and a wavelength range of light with a color that is complementary to a color of the light that is emitted by the second display panel.

A driver information system is known from EP 1 582 393 A2 comprising an operating unit with a plurality of functional elements for selecting primary functions, a plurality of control elements for selecting functions of a primary function, a selection element for selecting secondary functions of the functions and a return element for returning to a higher level. Furthermore, the driver information system comprises a display unit for the graphical representation of at least operating unit related information.

Further combination instruments for vehicles are known from EP 1 190 886 A2, EP 1 559 995 A1 and WO 03/057522 A1, for example.

REFERENCE CHARACTER LIST 1 vehicle
2 display device
3 device
4 control device
5 data memory
6 detection unit
7 display surface
8.1-8.3 first to third display region
9 operating unit
10 display element
10.1-10.3 sub-areas of the display element in the first display mode
10.1' outer ring
10.2' central ring
10.3' inner circular disk
11.1 pointer
11.2 pointer base
12.1 circular boundary
12.2 circular boundary
12.3 circular boundary
13, 13.1, 13.2 elongated elements
14.1, 14.2 graphical elements
15 ring segment-shaped element
16 own vehicle
17 scale
18 operator menu
19 graphical object
20 geographical map
21 marker
22 selection element
23 marker
24 highlighted region
25 combination instrument
26 region for the energy level indicator
27 scale
27.1 to 27.8 scale segments
28 graphical element
29 graphical object
30 numerical speed display
31 detection unit
32.1 to 32.9 scale marks
33 free area
34 graphical elements; horizontal lines
35.1 region
35.2 region
36 first boundary
37 graphical object
38 second boundary; horizon
L1 arc length
L2 initial length
L3 final length
$v_F$ speed of the vehicle
$v_L$ speed of the horizontal lines

The invention claimed is:

1. A method for displaying at least one parameter concerning the operation of a vehicle in the vehicle by a display device with a display surface, the method comprising:

the display element generating, in a first display mode of
the vehicle display device, a display element with a first
boundary and an area lying within the first boundary,
wherein the area is divided into at least a first sub-area
and a second sub-area and the first sub-area comprises
a scale, by which a state variable of the vehicle is
displayed, wherein, in the first display mode, the current value of the state variable is displayed by a
graphical element which extends from the second sub-area in the first sub-area to the scale;
detecting the parameter;
detecting an operating action by which the display device
is brought from the first display mode into a second
display mode; and
in the second display mode:
generating the display element so the second sub-area
is visually delimited from the first sub-area by a
second boundary,
dividing the second sub-area into a central area and an
inner area,
forming a third boundary between the central area and
the inner area, and
placing the central area between the first sub-area and
the inner area, that the graphical element extends
from the second boundary to the scale, so that the
graphical element is only displayed in the first sub-area, and that the value of the parameter is displayed
in the central area and the inner area using different
types of representation.

2. The method of claim 1, wherein
the second sub-area is already divided into the central area
and the inner area in the first display mode and the third
boundary is formed between the central area and the
inner area and
the graphical element is a pointer element that comprises
a pointer and a pointer base, wherein the pointer base
is placed on the third boundary in the first display mode
and is placed on the second boundary in the second
display mode.

3. The method of claim 2, wherein
in the event of a changeover from the first display mode
to the second display mode, the inner area is increased,
the central area is reduced, the pointer base is displaced
from the third boundary to the second boundary and at
the same time the length of the pointer is reduced from
its initial length to a final length.

4. The method of claim 1, wherein
the first boundary is circular, so that the display element
represents a circular disk in the first display mode, and
the second boundary and the third boundary are circular,
so that in the second display mode the first sub-area
with the scale forms an outer ring, the central area
forms a central ring and the inner area forms an inner
circular disk.

5. The method of claim 4, wherein
in the second display mode the value of the parameter is
displayed numerically in the inner circular disk and the
value of the parameter is represented by a length of a
ring segment-shaped element in the central ring,
wherein in the event of a change of the value of the
parameter, the numerical value and the length of the
ring segment-shaped element are changed accordingly.

6. The method of claim 4, wherein the parameter is an
acceleration of the vehicle,
wherein in the second display mode, at least one graphical
object is displayed in an initial position in the central
ring,
wherein if the vehicle is not accelerated, the graphical
object remains in the initial position, and
wherein if the vehicle is accelerated, the graphical object
is displaced away from the initial position in the central
ring.

7. The method of claim 6, wherein
the graphical object comprises a ring segment-shaped
object,
the initial position is displayed in the central ring by a
marker, wherein the ring segment-shaped object is
disposed in the initial position so it is bisected by the
marker,
if a negative acceleration is detected, the ring segment-shaped object is displaced in the central ring in a first
direction starting from the initial position, and
if a positive acceleration is detected, the ring segment-shaped object is displaced in a second direction that is
opposite to the first direction in the central ring.

8. The method of claim 6, wherein a region in the central
ring is highlighted, and the type of representation of the
graphical object is changed if the graphical object is displaced across the region in the first direction or the second
direction.

9. The method of claim 1, wherein a further operating
action is detected, with which the display is configured in the
central area and the inner area in the second display mode.

10. The method of claim 1, wherein
the parameter is selected from a number of possible
parameters by the further operating action, and
the selected parameter is displayed in the central area and
the inner area.

11. The method of claim 1, wherein the parameter is a
residual range, a consumption, an average consumption, a
refueling quantity, a residual time remaining to a destination,
an additional residual range to be achieved by a changed
manner of driving, an oil temperature, a speed of the vehicle
and/or a driving time since the last refueling of the vehicle.

12. The device of claim 11, wherein the detection unit is
connected to a plurality of sensors of the vehicle, by which
the value of the parameter can be determined.

13. A combination instrument in a vehicle with the device
of claim 11.

14. A device for displaying at least one parameter concerning the operation of a vehicle in the vehicle, the device
comprising:
a display device with a display surface, wherein the
display device can be operated in at least two display
modes;
an operating unit, configured to detect an operating action,
which brings the display device from the first display
mode to a second display mode;
a detection unit, configured to detect the parameter; and
a control device, configured to activate the display surface
depending on the display mode of the display device,
wherein, in the first display mode, a display element with
a first boundary and an area lying within the first
boundary are generated, wherein the area is divided
into at least a first sub-area and a second sub-area, and
the first sub-area comprises a scale, by which a state
variable of the vehicle is displayed,
wherein the current value of the state variable is displayed
in the first display mode by a graphical element, which
extends from the second sub-area in the first sub-area to
the scale, and
wherein, in the second display mode, the display element
is generated such that the second sub-area is visually
delimited from the first sub-area by a second boundary, wherein the second sub-area is divided into a central area and an inner area, wherein a third boundary is formed between the central area and the inner area, and wherein the central area is disposed between the first sub-area and the inner area, such that the graphical element extends from the second boundary to the scale, so that the graphical element is displayed only in the first sub-area and the value of the parameter is displayed in the central area and the inner area using different types of representation.

15. The device of claim 14, wherein the display surface is divided into at least three display regions, wherein the display element can be displayed in each of two display regions, and wherein a third display region can be displayed between the two display regions, by which the parameter that can be displayed in the central area and the inner area of the display element in the second display mode can be selected.

\* \* \* \* \*